(12) United States Patent
Port et al.

(10) Patent No.: US 9,551,509 B2
(45) Date of Patent: Jan. 24, 2017

(54) APPARATUSES AND METHODS FOR FASTENING ROOFING STRAPSAND STRUCTURAL MEMBERS TO ROOFS

(71) Applicants: Jonathan Port, Los Angeles, CA (US); Richard Pantel, Flemington, NJ (US)

(72) Inventors: Jonathan Port, Los Angeles, CA (US); Richard Pantel, Flemington, NJ (US)

( * ) Notice: Subject to any disclaimer, the term of this patent is extended or adjusted under 35 U.S.C. 154(b) by 0 days.

(21) Appl. No.: 14/799,640

(22) Filed: Jul. 15, 2015

(65) Prior Publication Data

US 2015/0330669 A1     Nov. 19, 2015

Related U.S. Application Data

(63) Continuation of application No. PCT/US2015/001174, filed on Jan. 16, 2015.

(60) Provisional application No. 61/928,218, filed on Jan. 16, 2014.

(51) Int. Cl.

| | |
|---|---|
| *E04B 1/38* | (2006.01) |
| *E04C 5/00* | (2006.01) |
| *F24J 2/52* | (2006.01) |
| *E04B 7/18* | (2006.01) |
| *E04D 13/00* | (2006.01) |
| *H02S 20/24* | (2014.01) |

(52) U.S. Cl.
CPC .............. *F24J 2/5241* (2013.01); *E04B 1/38* (2013.01); *E04B 7/18* (2013.01); *E04D 13/00* (2013.01); *F24J 2/5203* (2013.01); *F24J 2/5239* (2013.01); *F24J 2/5245* (2013.01); *H02S 20/24* (2014.12); *Y02E 10/47* (2013.01)

(58) Field of Classification Search
CPC .............. E04B 1/38; E04B 7/18; E04D 13/00; F24J 2/5245; F24J 2/5239; F24J 2/5203; F24J 2/5241; Y02E 10/47

USPC ............... 52/698, 173.3, 745.21, 302.1, 745.19,52/746.16, 551; 136/248, 251, 244; 29/897.3, 29/428; 248/237

See application file for complete search history.

(56) References Cited

U.S. PATENT DOCUMENTS

| | | | | |
|---|---|---|---|---|
| 5,082,704 A | * | 1/1992 | Higgins | C08G 18/0804 428/141 |
| 6,495,750 B1 | * | 12/2002 | Dinwoodie | F24J 2/4638 136/244 |
| 6,784,360 B2 | | 8/2004 | Nakajima | |
| 6,959,993 B2 | * | 11/2005 | Gross | F24J 2/07 126/684 |
| 7,185,473 B2 | * | 3/2007 | Pacione | A47G 27/025 428/62 |
| 8,209,919 B2 | * | 7/2012 | Beck | F24J 2/5205 126/623 |
| 8,316,593 B2 | * | 11/2012 | Smith | F24J 2/045 136/244 |
| 8,567,742 B2 | | 10/2013 | Sizelove | |

(Continued)

FOREIGN PATENT DOCUMENTS

| | | |
|---|---|---|
| DE | 202010002902 | 8/2010 |
| EP | 2312235 A2 | 4/2011 |
| WO | WO-2011132010 | 10/2011 |

OTHER PUBLICATIONS

"International Application Serial No. PCT/US15/11740, International Search Report mailed Apr. 28, 2015", 3 pgs.

*Primary Examiner* — Chi Q Nguyen
(74) *Attorney, Agent, or Firm* — Norton R. Townsley; Belasco Jacobs & Townsley LLP

(57) ABSTRACT

A number of apparatuses and methods for fastening roofing straps and structural members to roofs are disclosed.

4 Claims, 26 Drawing Sheets

(56) References Cited

U.S. PATENT DOCUMENTS

| | | | | |
|---|---|---|---|---|
| 9,239,173 B2* | 1/2016 | Balyon | .................. | F24J 2/5205 |
| 2003/0070368 A1* | 4/2003 | Shingleton | ............. | F24J 2/5205 |
| | | | | 52/173.3 |
| 2003/0094193 A1* | 5/2003 | Mapes | .................. | F24J 2/5207 |
| | | | | 136/244 |
| 2009/0302183 A1* | 12/2009 | Strizki | .................. | F24J 2/5233 |
| | | | | 248/309.1 |
| 2010/0059104 A1* | 3/2010 | Geary | .................... | E04D 11/00 |
| | | | | 136/251 |
| 2013/0009025 A1 | 1/2013 | Stearns | | |
| 2013/0074441 A1* | 3/2013 | Stearns | .................. | E04D 13/10 |
| | | | | 52/705 |
| 2014/0331594 A1* | 11/2014 | Stearns | ............... | H01Q 1/1207 |
| | | | | 52/705 |

* cited by examiner

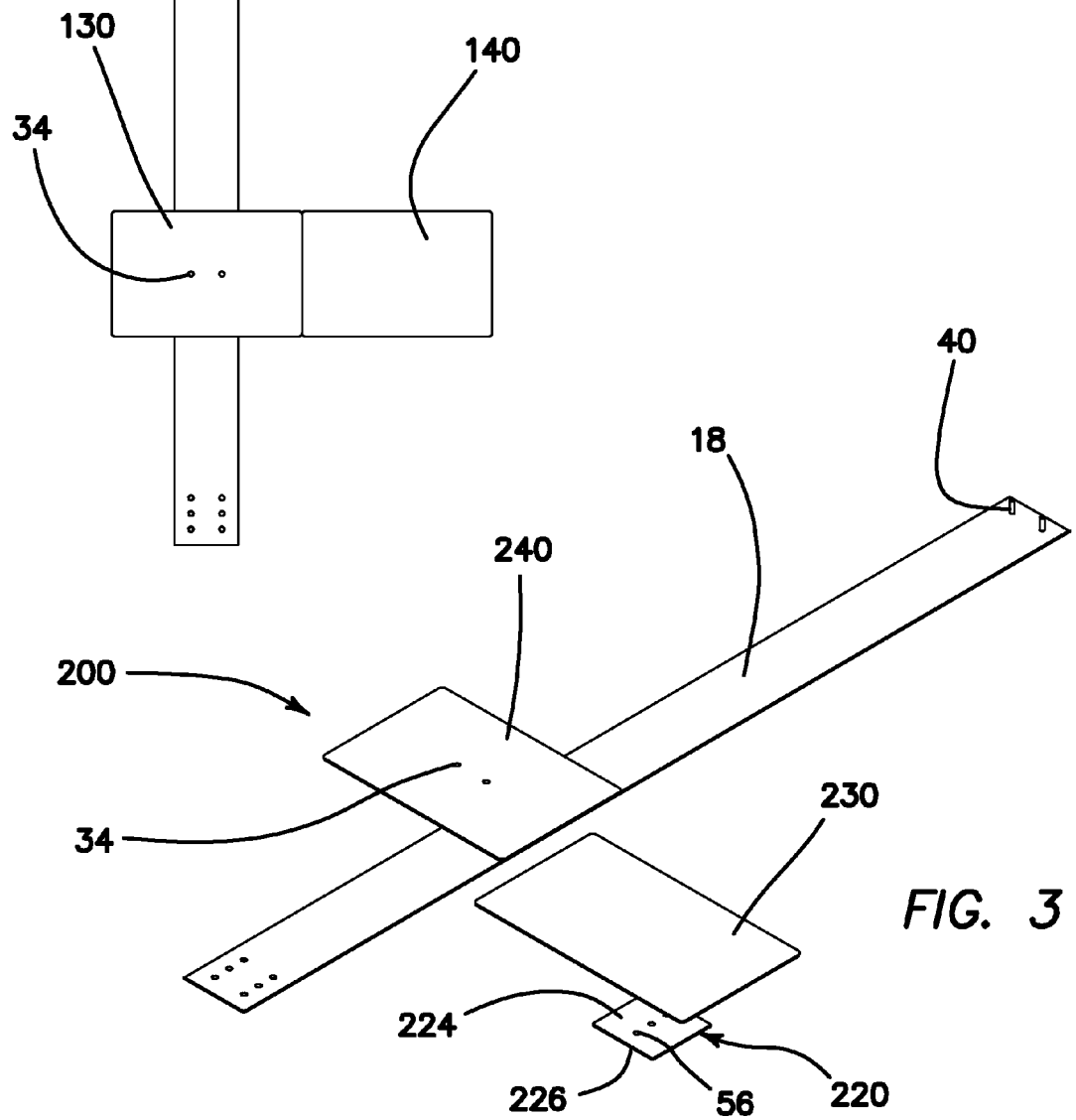

100, 200, 300, 400, 500

100, 200, 300, 400, 500

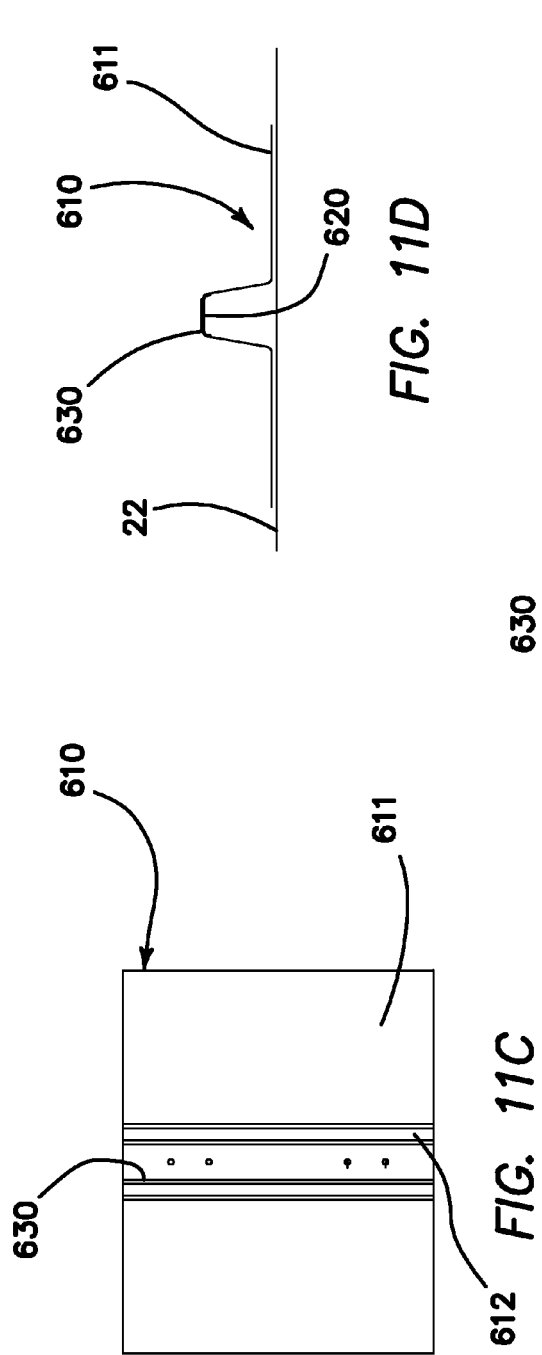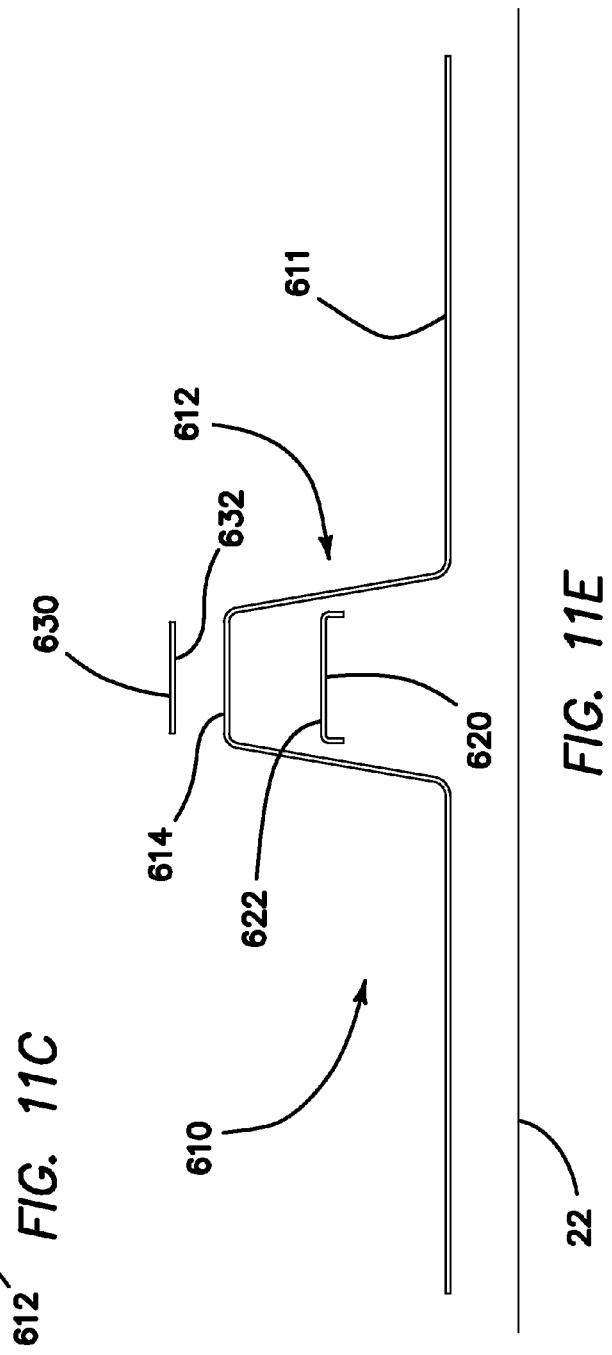

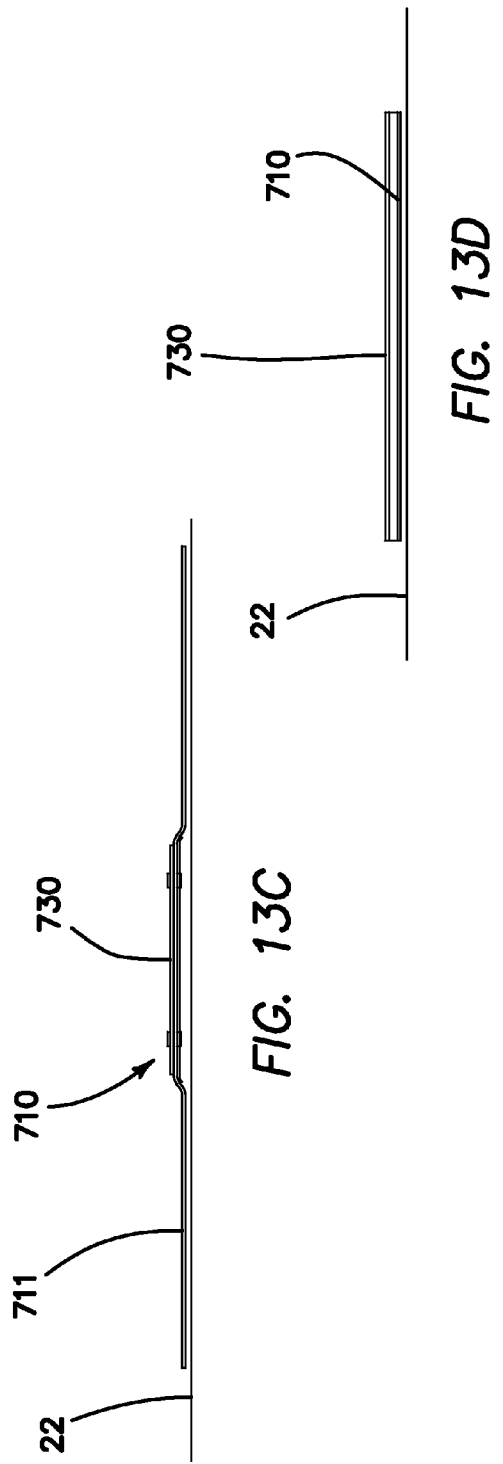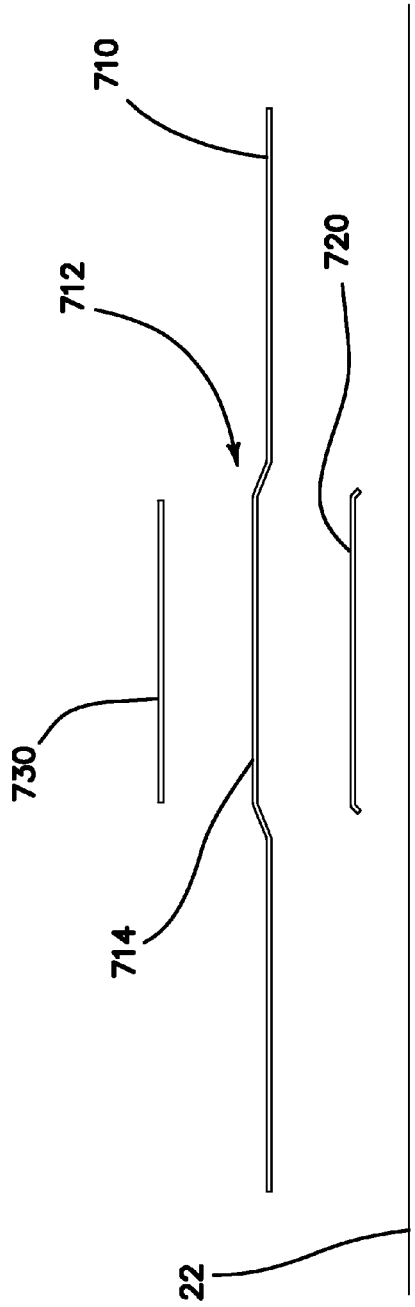

APPARATUSES AND METHODS FOR FASTENING ROOFING STRAPS AND STRUCTURAL MEMBERS TO ROOFS

CROSS REFERENCE TO RELATED APPLICATIONS

This application is a continuation of PCT Patent Application No. PCT/US15/1174, filed 16 Jan. 2015, which claims the benefit of U.S. Provisional Application No. 61/928,218, filed 16 Jan. 2014, the entire specification, claims and drawings of which are included in this document by reference.

BACKGROUND OF THE INVENTION (1) Field of the Invention

The present invention relates to the field of solar panels and more particularly to apparatuses and methods for attaching solar panel straps and structural members on surfaces, including roofs, walls and the ground. Further definition of solar panel straps and structural members may be found in U.S. Pat. Nos. 7,814,899 and 8,870,139; and PCT Patent Application No. PCT/US2013/025622 (published as WO 2014/123747); the entire specifications, claims and drawings of which are included in this document by reference.

(2) Description of the Related Art

Solar panels can be of the photovoltaic type, of the thermal type or combinations. They can be installed as is or contained within a frame. Solar panels must be mounted correctly in order to maximize power production and to prevent movement of the panels from the force of wind and, in earthquake prone area, earthquake. The proper solar panel mounting provides stability and the proper directional and latitudinal orientation for the solar array.

Different mounting systems are available depending on whether the modules will be mounted on a roof, a wall, the ground, or a pole. For mounting on a roof or the ground there are ballast mounts, flush mounts (such as Modular Iron-Ridge XRS available from IronRidge in Willits, Calif.) standing seams mounts, and adjustable mounts (such as those available from Unirac in Albuquerque, N. Mex.). These usually include a tilted rack, firmly attached to the substrate surface, on which the modules are firmly mounted; or brackets of at least two different heights, firmly attached to the substrate surface, to which the ends of the modules are firmly attached.

Such systems are heavy and expensive to fabricate and time consuming to install. They also involve penetration of the roof membrane, which has the potential to cause leakage of water. What is needed is a mounting system which is cheaper to fabricate and less time consuming to install. Preferably the improved system can be easily fabricated on site or provided as a kit. The inventor has developed three improvements on the state of the art: U.S. Pat. Nos. 7,814,899 and 8,870,139, and PCT Patent Application No. PCT/US2013/025622.

This inventor has now developed another improvement on the state of the art. This improvement provides a positive mechanical connection of the solar panel mounting system to the roof, without penetrating the membrane. This improvement meets all requirements for structural strength, wind resistance and earthquake resistance. See attached report entitled "STRUCTURAL CALCULATIONS for Forever 21 Project", which is incorporated in this application by reference.

Development of a solar panel mounting system which is cheaper to fabricate and less time consuming to install represents a great improvement in the field of solar panel mounting and satisfies a long felt need of the solar panel installer and owner.

SUMMARY OF THE INVENTION

The objects of this invention are to:

provide a positive seal which prevents moisture from penetrating the roof;

provide strength sufficient to provide wind resistant to the solar panels; and provide a positive mechanical connection between the solar panels and the roof.

This invention is encompasses a number of different embodiments.

First Embodiment

The first embodiment is intended to be used on roofs that are made of material that cannot be welded. The first embodiment comprises:

a first strip of roofing material of any convenient shape, under the solar panel mounting strap, perpendicularly crossing the solar panel mounting strap and fastened to the roof;

a metal plate, smaller than the first strip, on top of the first strip and next to the solar panel mounting strap, screwed or nailed through the first strip and the roof, and into the roof substrate or a roof rafter;

a second strip of roofing material having a width similar to the width of the first strip, and a length about half the length of the first strip, perpendicularly crossing the solar panel mounting strap, above the solar panel mounting strap, lined up end to end with one end of the first strip and fastened to the first strip; and a third strip of roofing material, having length about half that of the first strip, perpendicular to the solar panel mounting strap, lined up end to end with the other end of the first strip and fastened to the first strip and metal plate.

In addition there may be fastening systems fastening the strap to the second strip. The ends of the straps also have holes for insertion of studs so that the straps can be easily fastened together end to end with nuts and washers.

The fastening system may further include a top metal plate fastened to and above the first and/or third strips.

The fastening methods may be adhesive bonding or fastening with a fastener or welding if the components are made of weldable material.

Finally, the edges may be sealed with a waterproofing sealant in order to prevent entrance of water.

Second Embodiment

The second embodiment is intended to be used on roofs that are made of material that can be welded. The second embodiment comprises:

a metal plate, fastened to the roof and screwed through the roof into a roof rafter, next to the solar panel mounting strap;

a first strip of roofing material, larger than the metal plate, fastened to the top and the roof, perpendicular to and under or next to the solar panel mounting strap; and a second strip of roofing material having the a width similar to that of the first strip, perpendicular to and crossing the solar panel mounting strap, in line with and overlapping the first strip, fastened to the roof and the first strip.

In addition there may be fastening systems fastening the strap to the second strip.

Finally, the edges may be sealed with a waterproofing sealant.

Third Embodiment

The third embodiment is intended to be used on roofs that are made of material that can be welded. The third embodiment comprises:

a first strip of roofing material, next to and perpendicular to the solar panel mounting strap, fastened to the roof;

a metal plate, smaller than the first strip, on top of the first strip and next to the solar panel mounting strap, nailed or screwed through the first strip and the roof, and into the roof substrate or a roof rafter;

a second strip of roofing material of the same size as the first strip, perpendicular to and next to the solar panel mounting strap, lined up in vertical registration with the first strip and fastened to the first strip;

a third strip of roofing material of the same size as the first strip perpendicular to and crossing the solar panel mounting strap, interleaved between the first and second strips or overlapping the second strip and fastened to the roof and the first and second strips or the second strip.

In consequence the metal plate is encapsulated. The second and third strips may overlap each other The fastening system may further comprise a top metal plate fastened to and above the second and/or third strips.

The metal plate may be treated to be weldable to weldable roofing material and then welded to the first and second strips. Finally, the edges may be sealed with a waterproofing sealant.

In addition there may be fastening systems fastening the strap to the second strip.

Fourth Embodiment

The fourth embodiment comprises:

a first strip of roofing material, perpendicular to and crossing the solar panel mounting strap, below the solar panel mounting strap and fastened to the roof; and a second strip of roofing material the same size as the first strip, perpendicular to and crossing the solar panel mounting strap, above the solar panel mounting strap. The first and second strips are fastened to each other.

In addition there may be fastening systems fastening the strap to the second strip.

The fourth embodiment may also be fastened to the roof or a roof rafter with circular or rectangular seismic anchors. Finally, the edges may be sealed with a waterproofing sealant.

A first alternative to the fourth embodiment comprises:

a first strip of roof material longer than the solar panel mounting strap is wide placed perpendicularly across the solar panel mounting strap; and a second strip of roof material longer than the solar panel mounting strap is wide placed perpendicularly under the solar panel mounting strap and adhered to the roof and the first strip.

This first alternative embodiment may further comprise: holes through the solar panel mounting strap and the first strip, a stud inserted pointing upwards through the holes so that a threaded portion of it protrudes above the solar panel mounting strap, and a nut on the protruding portion, which fastens the solar panel mounting strap and first strip together.

A second alternative to the fourth embodiment comprises:

a first strip of roof material longer than the solar panel mounting strap is wide placed perpendicularly across the solar panel mounting strap, a second strip of roof material longer than the solar panel mounting strap is wide placed perpendicularly under the solar panel mounting strap, and a seismic anchor or seismic plate fastened by a screw into the roof substrate or a roof joist. The seismic anchor or plate has a top metal plate, the top surface of which is adhered to the bottom surface of the second strip and the bottom surface of the first strip is adhered to the top surface of the second.

This second alternative to the fourth embodiment may further comprise: holes through the solar panel mounting strap and the first strip, a stud inserted pointing upwards through the holes so that a threaded portion of it protrudes above the solar panel mounting strap, and a nut on the protruding portion, which fastens the solar panel mounting strap and first strip together.

The first alternative to the fourth embodiment is made by
placing the first strip perpendicularly across the solar panel mounting strap;
placing the second strip perpendicularly under the solar panel mounting strap; and
adhering the second strip to the roof and the first strip.

The method of fabricating this first alternative to the fourth embodiment may further comprise the steps of:
drilling a first hole through the solar panel mounting strap;
drilling a second hole through the first strip;
inserting the threaded stud pointing upwards through the holes so that its threaded portion protrudes above the solar panel mounting strap;
screwing a nut 42 on the protruding portion, so that the solar panel mounting strap and first strip are joined to each other.

Fifth Embodiment

The fifth embodiment comprises one strip, of weldable roofing material. It is perpendicular to, across and above the strap. If the roof is made of weldable material the strip is welded to the roof. Otherwise the strip is bonded to the roof or fastened to the roof with mechanical fasteners such as roofing nails, screws, lag bolts, etc. This traps the strap between the strip and the roof.

In addition there may be fastening systems fastening the strap to the strip.

An alternative embodiment to the fifth embodiment comprises: a strip of roof material longer than the solar panel mounting strap is wide placed perpendicularly across the solar panel mounting strap; and a seismic anchor or seismic plate screwed by a screw into the roof substrate or a roof joist. The seismic anchor or plate has a top metal plate, the top surface of which is adhered to the bottom surface.

This alternative to the fifth embodiment may further comprise: holes through the solar panel mounting strap and the first strip, a stud inserted pointing upwards through the holes so that a threaded portion of it protrudes above the solar panel mounting strap, and a nut on the protruding portion, which fastens the solar panel mounting strap and first strip together.

Finally, the edges may be sealed with a waterproofing sealant

Alternative for First Through Fifth Embodiments

Any of the first through the fifth embodiments of this invention may be reinforced with a top metal plate. If the top metal plate is treated to be weldable to weldable roofing material it can be welded onto the other. Otherwise, it can be adhesively bonded to the other embodiments. Alternatively, it may be fastened with a fastening systems.

Sixth Embodiment

The sixth embodiment of this invention is intended to fasten rails or other structural members to a roof. Such devices have much more depth than a strap.

The sixth embodiment comprises a strip of roofing material with a raised section in the middle, surrounded by a lower section. The raised section is intended to cross a structural member perpendicularly. The raised section has a top which is larger than the width of the structural member. Above and below the top are metal strips, 630. The lower strip is sized and shaped to fit snugly over the top of the structural member. The upper strip is sized and shaped to fit over the top.

The metal strips are preferably also coated with a weldable material. Then all the components of this embodiment can be welded to each other. Otherwise they can be adhesively bonded to each other. Alternatively, they can be fastened to each other and the structural member with fasteners. If the roofing is made of weldable material then the strip of roofing material can be welded to the roof. If not, the strip can be adhesively bonded to the roof or attached with fasteners.

Finally, the edges may be sealed with a waterproofing sealant.

Seventh Embodiment

The seventh embodiment of this invention is intended to fasten straps to a roof.

The seventh embodiment comprises a strip of roofing material with a raised section in the middle. The raised section is intended to cross a strap perpendicularly. The raised section has a top which is larger than the width of the strap. Above and below the top are metal strips. The lower strip is sized and shaped to fit snugly over the top of the strap. The upper strip is sized and shaped to fit the top.

The metal strips are preferably coated with a weldable material. Then all the components of this embodiment can be welded to each other. Otherwise they can be adhesively bonded to each other. Alternatively, they can be fastened to each other and the strap with fasteners. If the roof is made of weldable material then the strip of roofing material can be welded to the roof. If not, the strip can be adhesively bonded to the roof or attached with fasteners.

Finally, the edges may be sealed with a waterproofing sealant.

The sixth embodiment may be attached to the member with fasteners. Or ballast trays. The trays are shaped to hold the member down to a roof.

A seismic anchor is a metal washer and a self-tapping screw, with length sufficient to adequately penetrate the roof. The screw is inserted through the hole in the center of the washer. The metal may be treated to be weldable to weldable roofing material. A seismic plate is similar but preferably has two screws through it which screw through the roof and into the substrate or a roof rafter. The plate is made of metal, which may be treated to be weldable to weldable roofing material.

The sixth or seventh embodiments are placed over a structural member or strap on the roof. One side of the embodiment is raised and a seismic anchor fully installed in the roof near middle of the flap. Raising parts of the embodiments is possible because they are made out of roofing material which is flexible. Next the roofing material is welded to the top of the washer and welded to the roof. If additional support is needed a second seismic anchor can be installed under the other side. Finally, the edges may be sealed with a waterproofing sealant.

The sixth or seventh embodiments can be attached to a roof with a seismic anchor. A seismic anchor is a washer with a self-tapping screw, with length sufficient to adequately penetrate the roof, through its central hole. The washer is made of metal and may be weldable to weldable roofing material.

If additional support is needed a second seismic anchor may be installed under the other side. Finally, the edges may be sealed with a waterproofing sealant.

Eighth Embodiment

The eighth embodiment comprises a seismic plate including a stud pointing upwards, below the strap, which is modified with a hole for allowing the stud to pass through. Screws through the plate fasten the plate to the roof substrate or a roof rafter. Between the roof and the plate and between the plate and the strap is placed a layer of elastomeric roof coating. After assembly in the proper order, tightening the nut on the stud causes the elastomeric layers to compress, which provides an effective seal, and prevents moisture from entering the interfaces and percolating down the screws.

Roofing is sometimes referred to as a membrane. Weldable roofing material is typically thermoplastic polyolefin (TPO), available from a number of companies including: Firestone Building Products of Indianapolis, Ind.; Carlisle Syntec Systems of Carlisle, Pa.; and Johns Manville of Denver, Colo. TPO can be made of polyvinyl chloride (PVC) or ethylene-propylene-diene-monomer (EPDM).

An appreciation of the other aims and objectives of the present invention and an understanding of it may be achieved by referring to the accompanying drawings and description of a preferred embodiment.

BRIEF DESCRIPTION OF THE DRAWINGS

FIG. 2 is a top view of the first embodiment of this invention. For clarity, mechanical fasteners are not shown.

FIG. 3 is an exploded, isometric view of a second embodiment of this invention as used to fasten a mounting strap. For clarity, some mechanical fasteners are not shown.

FIG. 11C is a top view of the sixth embodiment. For clarity the mechanical fasteners are not shown.

FIG. 11D is an end view of the sixth embodiment. For clarity the mechanical fasteners are not shown.

FIG. 11E is an exploded, end view of the sixth embodiment. For clarity the mechanical fasteners are not shown.

FIG. 13C is an end view of the seventh embodiment. For clarity the mechanical fasteners are not shown.

FIG. 13D is a side elevational view of the seventh embodiment. For clarity the mechanical fasteners are not shown.

FIG. 13E is an exploded, end view of the seventh embodiment. For clarity the mechanical fasteners are not shown.

DETAILED DESCRIPTION OF THE PREFERRED EMBODIMENT

First Embodiment

Figure 1:
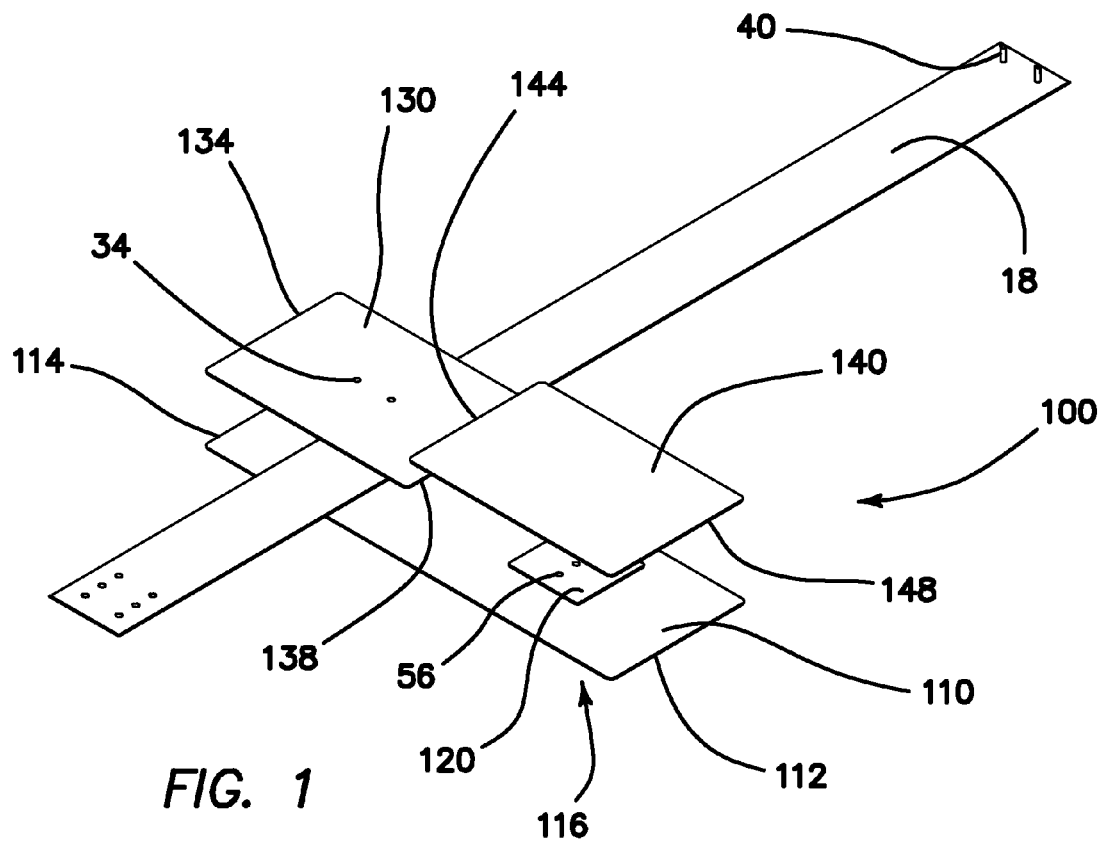
FIG. 1 is an exploded, isometric view of a first embodiment of this invention as used to fasten a mounting strap. For clarity, some mechanical fasteners are not shown. See U.S. Pat. Nos. 7,814,899 and 8,870,139; and PCT Patent Application No. PCT/US2013/025622 for examples of the usage of straps in mounting of solar panels.
Figure 2A:
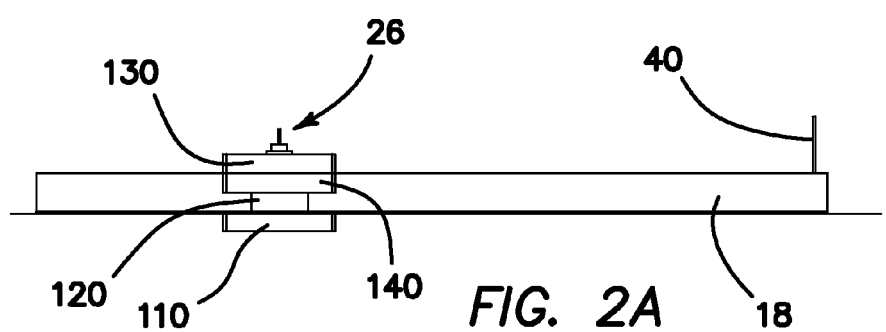
FIG. 2A is a side elevational view of this first embodiment.
Figure 2B:
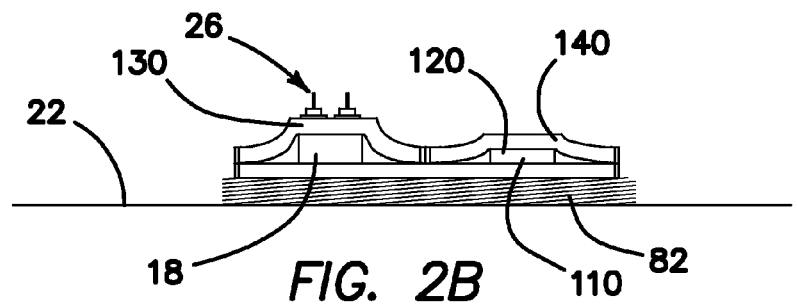
FIG. 2B is an end elevational view of this first embodiment.
Figure 5:
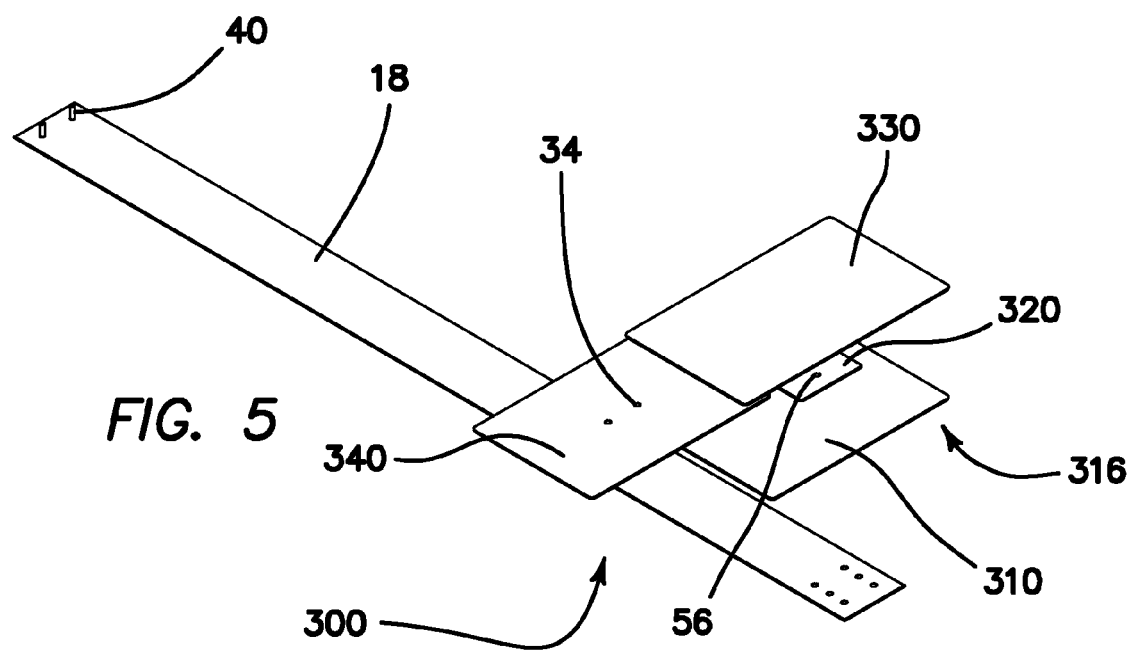
FIG. 5 is an exploded, isometric view of a third embodiment of this invention as used to fasten a mounting strap. For clarity some mechanical fasteners are not shown.

The first embodiment 100 is intended to be used on roofs 22 that are made of material that cannot be welded. Referring to FIGS. 1, 2, 2A and 2B, it can be seen that the first embodiment 100 of this invention comprises:

a. a first strip 110 of roofing material of any convenient shape, having two ends 114, 112, two sides, a length and a width, under the solar panel mounting strap 18, perpendicularly crossing the solar panel mounting strap 18, and fastened to the roof 22 by a first fastening method;

b. a metal plate 120, smaller than the first strip 110, on top of the first strip 110 and next to the solar panel mounting strap 18, screwed or nailed through the first strip 110 and the roof 22, and into a roof substrate or a roof rafter;

c. a second strip 130 of roofing material, having two ends 134, 138, two sides, a width similar to the width of the first strip 110, and a second length about half the length of the first strip 110, perpendicularly crossing the solar panel mounting strap 18, above the solar panel mounting strap, lined up end 134 to end 114 with one end 114 of the first strip 110 and fastened to the first strip 110 by a second fastening method; and d. a third strip 140 of roofing material, having a width similar to the first strip 110, two ends 144, 148 and two sides, but of length about half that of the first strip 110, perpendicular to the solar panel mounting strap 18, lined up end 148 to end 112 with the other end 112 of the first strip 110 and fastened to the first strip 110 and metal plate 120 by a third fastening method.

Figure 4:
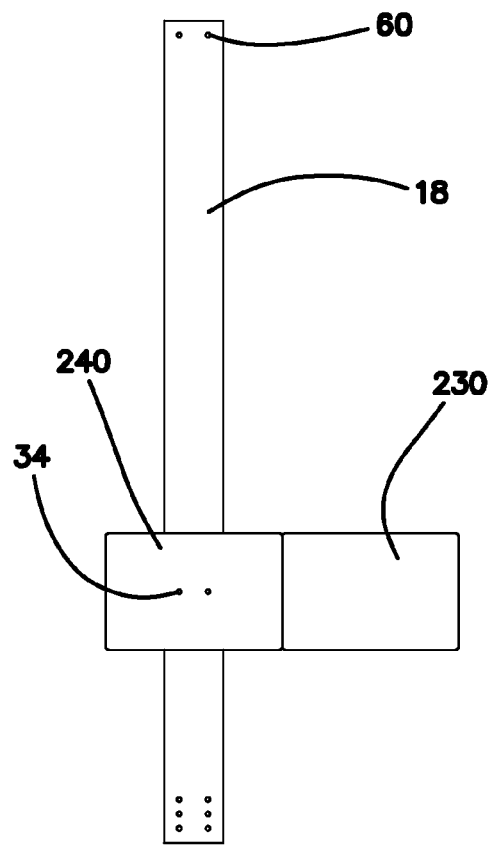
FIG. 4 is a top view of the second embodiment of this invention. For clarity the mechanical fasteners are not shown.
Figure 4A:
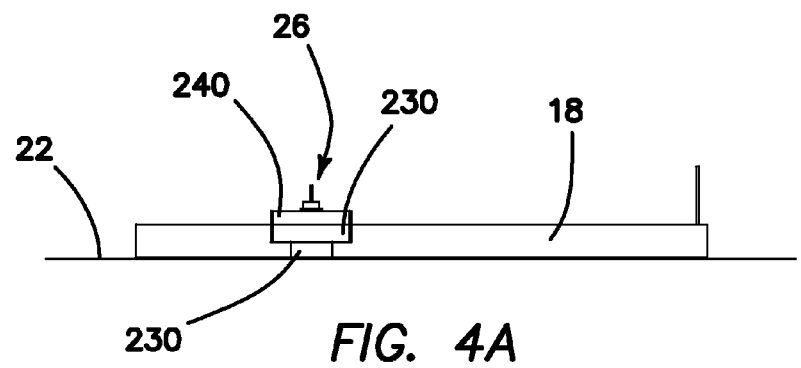
FIG. 4A is a side elevational view of this second embodiment.
Figure 4B:
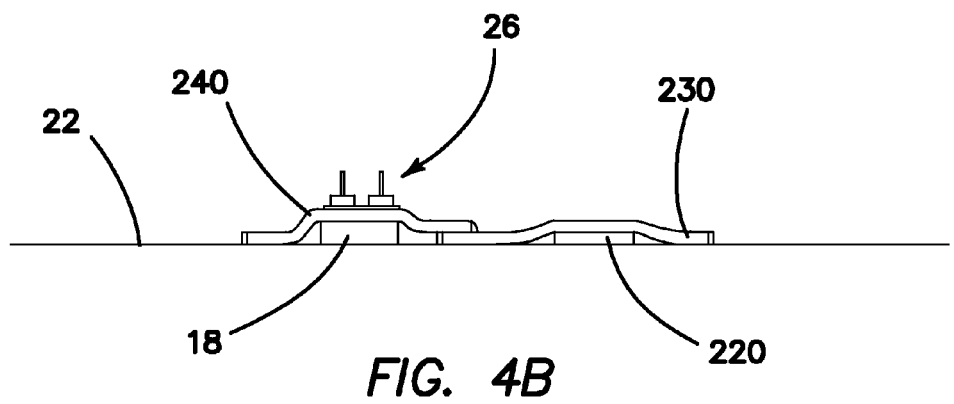
FIG. 4B is an end elevational view of this second embodiment.
Figure 4C:
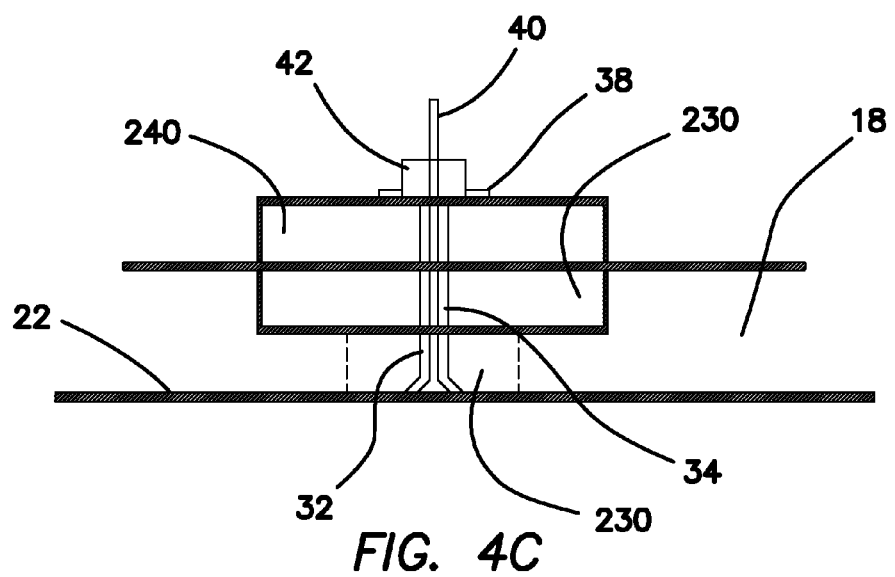
FIG. 4C is a cross section showing the preferred mechanical preferred fastening system used in all embodiments of this invention
Figure 6:
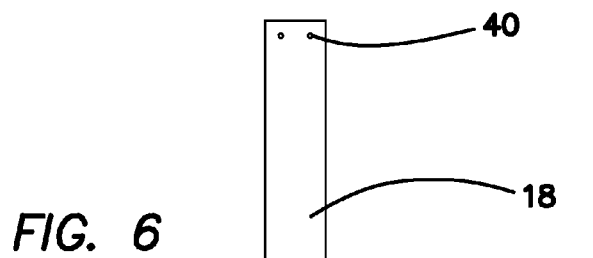
FIG. 6 is a top view of the third embodiment of this invention. For clarity the mechanical fasteners are not shown.
Figure 6A:
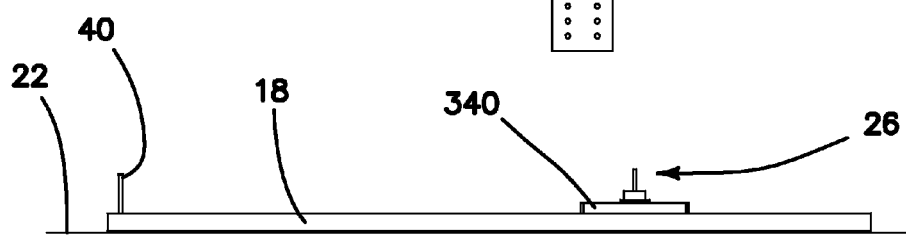
FIG. 6A is a side elevational view of this third embodiment.
Figure 6B:
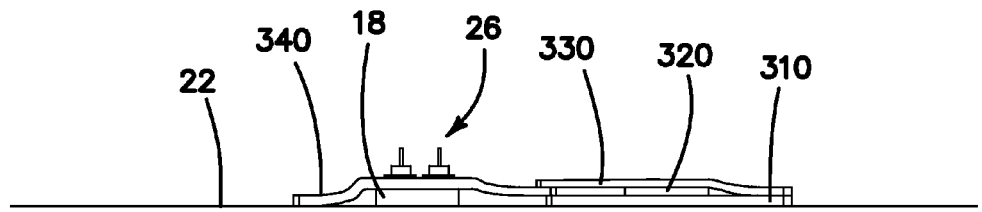
FIG. 6B is an end elevational view of this third embodiment.

In addition there may be fastening systems 26 fastening the strap 18 to the second strip 130. The preferred fastening systems 26 comprise a flush head, self-clinching threaded stud 40 clinched pointing upwards through a hole 32 (not visible) in the strap 18. The stud 40 is long enough to pass through a hole 34 in the second strip 130 where a washer 38 and nut 42 are screwed onto it thus securely fastening the second strip 130 to the strap 18. The nut 42 may be castellated and secured through a hole in the end of the stud 40 by a cotter pin, as is well known, to prevent rotation of the nut 42. An example of the fastening system is shown in FIG. 4C. The ends of the straps 18 also have holes 52 for insertion of studs 40 so that the straps 18 can be easily fastened together end to end with nuts 42 and washers.

As a consequence of this construction, the metal plate 120 is encapsulated and the metal plate 120 is in the same plane as the solar panel mounting strap 18. The second 130 and third 140 strips may be co-planar. The ends 112, 114 and sides may be straight lines or curves and second 130 and third 140 strips may overlap.

The metal plate 120 clamps the first strip 110 in place and is satisfactory for seismic installations. Finally, the edges may be sealed with a waterproofing sealant in order to prevent entrance of water into this embodiment 100. One suitable waterproof sealant is RTV silicone rubber available from a number of manufacturers, such as GE, of Wilton, Conn.; and Dow Corning of Midland, Mich. Another is Henry's roofing compound, available from Henry Company, El Segundo, Calif.

The fastening system may further comprise a top metal plate 30 fastened to and above the first 130 and/or third 140 strips by a fourth fastening method. See FIGS. 9 and 10. The fastening methods may be adhesive bonding or fastening with a fastener. Alternatively, if the first strip 110 and roof 22, or first strip 110 and second strip 130 are made of weldable material; or if the first strip 110 and second strip 130 are made of weldable material and the metal plate 120 is treated to be weldable to weldable roofing material; or if the top metal plate 30 is treated to be weldable to weldable roofing material and the first 130 and third 140 strips are made from weldable roofing material; by welding.

Second Embodiment

The second embodiment 200 is intended to be used on roofs 22 that are made of material that can be welded. Referring to FIGS. 3, 4, 4A, 4B and 4C, it can be seen that the second embodiment 200 of this invention comprises:

a. a metal plate 220 having a top 224 and a bottom 226, fastened to the roof 22 by a first fastening method and screwed through the roof 22 into a roof rafter, next to the solar panel mounting strap 18;

b. a first strip 230 of roofing material, larger than the metal plate 220, having a width and four edges fastened to the top 224 and the roof by a second fastening method, perpendicular to and under or next to the solar panel mounting strap 18; and c. a second strip 240 of roofing material having the a width similar to that of the first strip 230 and four edges, perpendicular to and crossing the solar panel mounting strap 18, in line with and overlapping the first strip 230, fastened to the roof 22 and the first strip 230 by a third fastening method.

As a consequence of this construction, the metal plate 220 is in the same plane as the solar panel mounting strap 18 and the edges may be straight lines or curves. The fastening system 200 may further comprise a top metal plate 30 fastened to and above the first 230 and/or second 240 strips by a fourth fastening method. See FIGS. 9 and 10.

The fastening methods are adhesive bonding; or, if the bottom 226 is treated to be weldable to weldable roofing material and the roof 22 is made of weldable roofing material; or the top 224 is treated to be welded to weldable roofing material, and the first strip 230 and the roof 22 are made of weldable roofing material; or, if the roof 22, first strip 230 and second strip 240 are made of weldable roofing material; welding.

The roofing material used for the first 110, second 130 and third 140 strips is the kind that can be welded, typically with heat. The metal plate 120 is in the same plane as the strap 18 and, depending on the thickness of the strap.

In addition there may be fastening systems 26 fastening the strap 18 to the second strip 240. The preferred fastening systems 26 comprise a flush head, self-clinching threaded stud 40 clinched pointing upwards through a hole 32 (not visible) in the strap 18. The stud 40 is long enough to pass through a hole 34 in the second strip 240 where a washer 38 and nut 42 are screwed onto it thus securely fastening the second strip 240 to the strap 18. The nut 42 may be castellated and secured through a hole in the end of the stud 40 by a cotter pin, as is well known, to prevent rotation of the nut 42. An example of the fastening system is shown in FIG. 4C.

Finally, the edges may be sealed with a waterproofing sealant in order to prevent entrance of water into this embodiment 200.

Third Embodiment

The third embodiment 300 is intended to be used on roofs 22 that are made of material that can be welded. Referring to FIGS. 5, 6, 6A and 6B, it can be seen that the third embodiment 300 of this invention comprises:

a. a first strip 310 of roofing material, next to and perpendicular to the solar panel mounting strap 18, fastened to the roof 22 by a first fastening method;

b. a metal plate 320, smaller than the first strip 310, on top of the first strip 310 and next to the solar panel mounting strap 18, nailed or screwed through the first strip 310 and the roof 22, and into a roof substrate or a roof rafter;

c. a second strip 340 of roofing material of the same size as the first strip 310, perpendicular to and next to the solar panel mounting strap 18, lined up in vertical registration with the first strip 310 and fastened to the first strip 310 by a second fastening method; whereby the metal plate 320 is encapsulated; and d. a third strip 340 of roofing material of the same size as the first strip 310 perpendicular to and crossing the solar panel mounting strap 18, interleaved between the first 310 and second 330 strips or overlapping the second strip 330 and fastened to the roof 22 and the first 310 and second 330 strips or the second strip 330 by a third fastening method.

The fastening system may further comprise a top metal plate 30 fastened to and above the second 330 and/or third 340 strips by a fourth fastening method.

The fastening method may be adhesive bonding; or, if the roofing 22 and strip 310 are made of weldable roofing material; or, if the first strip 310 and the second strip 330 are made of weldable roofing material; or, if the roof 22, the first strip 310, the second strip 330 and the third strip 340 are made of weldable roofing material; or, if the top metal plate 30 is treated to be weldable to weldable roofing material and the first 310 and third 340 strips are made from weldable roofing material; welding.

The roofing material used for the first 310, second 330 and third 340 strips is the kind that can be welded, typically with heat. The second 330 and third 340 strips may overlap each other.

The metal plate 320 may be treated to be weldable to weldable roofing material and then welded to the first 310 and second 330 strips. The plate 320 clamps the first strip 310 in place and is satisfactory for seismic installations.

In addition there may be fastening systems 26 fastening the strap 18 to the second strip 340. The preferred fastening systems 26 comprise a flush head, self-clinching threaded stud 40 clinched pointing upwards through a hole 32 (not visible) in the strap 18. The stud 40 is long enough to pass through a hole 34 in the third strip 340 where a washer 38 and nut 42 are screwed onto it thus securely fastening the second strip 340 to the strap 18. The nut 42 may be castellated and secured through a hole in the end of the stud 40 by a cotter pin, as is well known, to prevent rotation of the nut 42. An example of the fastening system is shown in FIG. 4C.

Finally, the edges may be sealed with a waterproofing sealant in order to prevent entrance of water into this embodiment 300.

Fourth Embodiment

Figure 7:
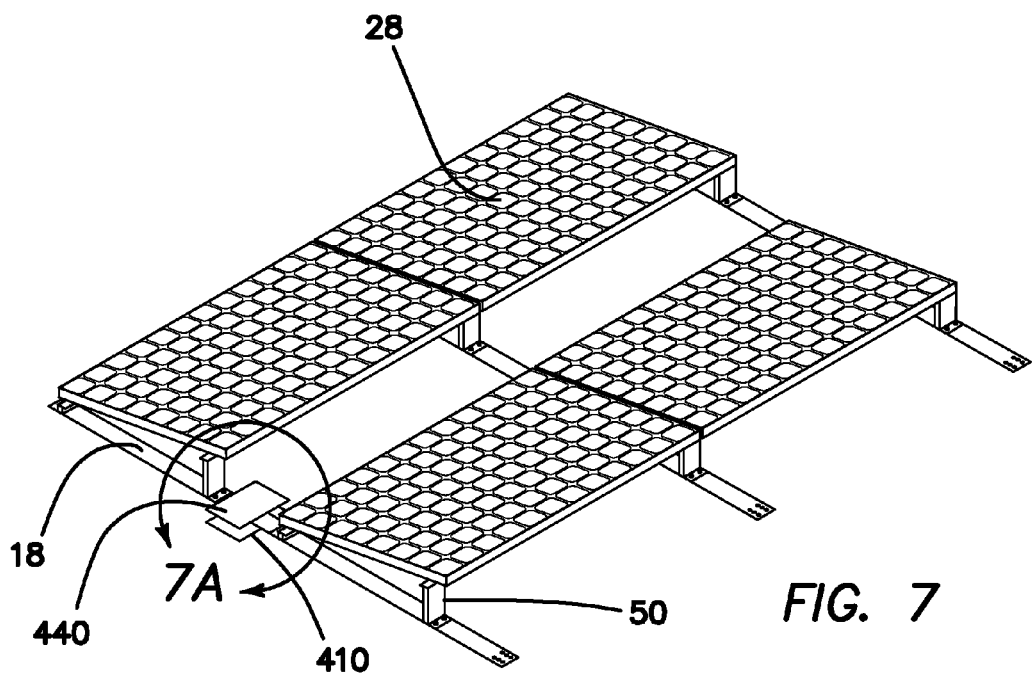
FIG. 7 is an isometric view of a fourth embodiment of this invention as used to fasten a mounting strap with brackets attached to angled solar panels.
Figure 7A:
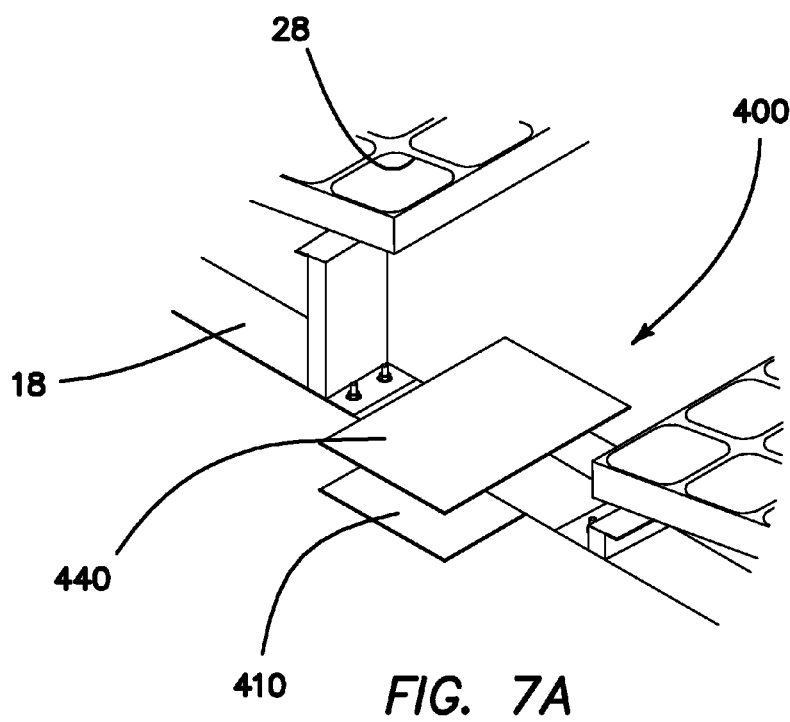
FIG. 7A is an enlarged view of the area annotated A on FIG. 7.

FIG. 7 is an isometric view of a fourth embodiment 400 of this invention as used to fasten a solar panel mounting strap 18 to angled solar panels 28 via support brackets 50. FIG. 7A is an enlarged view of the area annotated A on FIG. 7. As can be seen from these figures, the fourth embodiment comprises:

a. a first strip 410 of roofing material having edges, perpendicular to and crossing the solar panel mounting strap 18, below the solar panel mounting strap 18 fastened to the roof 22 by a first fastening method; and b. a second strip 440 of roofing material having edges perpendicular to and crossing the solar panel mounting strap 18, above the solar panel mounting strap 18; the second strip 440 being the same size as the first strip 410; the first 410 and second 440 strips being fastened to each other by a second fastening method.

In addition there may be fastening systems 26 fastening the strap 18 to the second strip 440. The preferred fastening systems 26 comprise a flush head, self-clinching threaded stud 40 clinched pointing upwards through a hole 32 (not visible) in the strap 18. The stud 40 is long enough to pass through a hole 34 in the third strip 340 where a washer 38 and nut 42 are screwed onto it thus securely fastening the second strip 440 to the strap 18. The nut 42 may be castellated and secured through a hole in the end of the stud 40 by a cotter pin, as is well known, to prevent rotation of the nut 42. The fourth embodiment 400 is illustrated with a fastening system in FIG. 7B. An example of the fastening system is shown in FIG. 4C.

Figure 17:
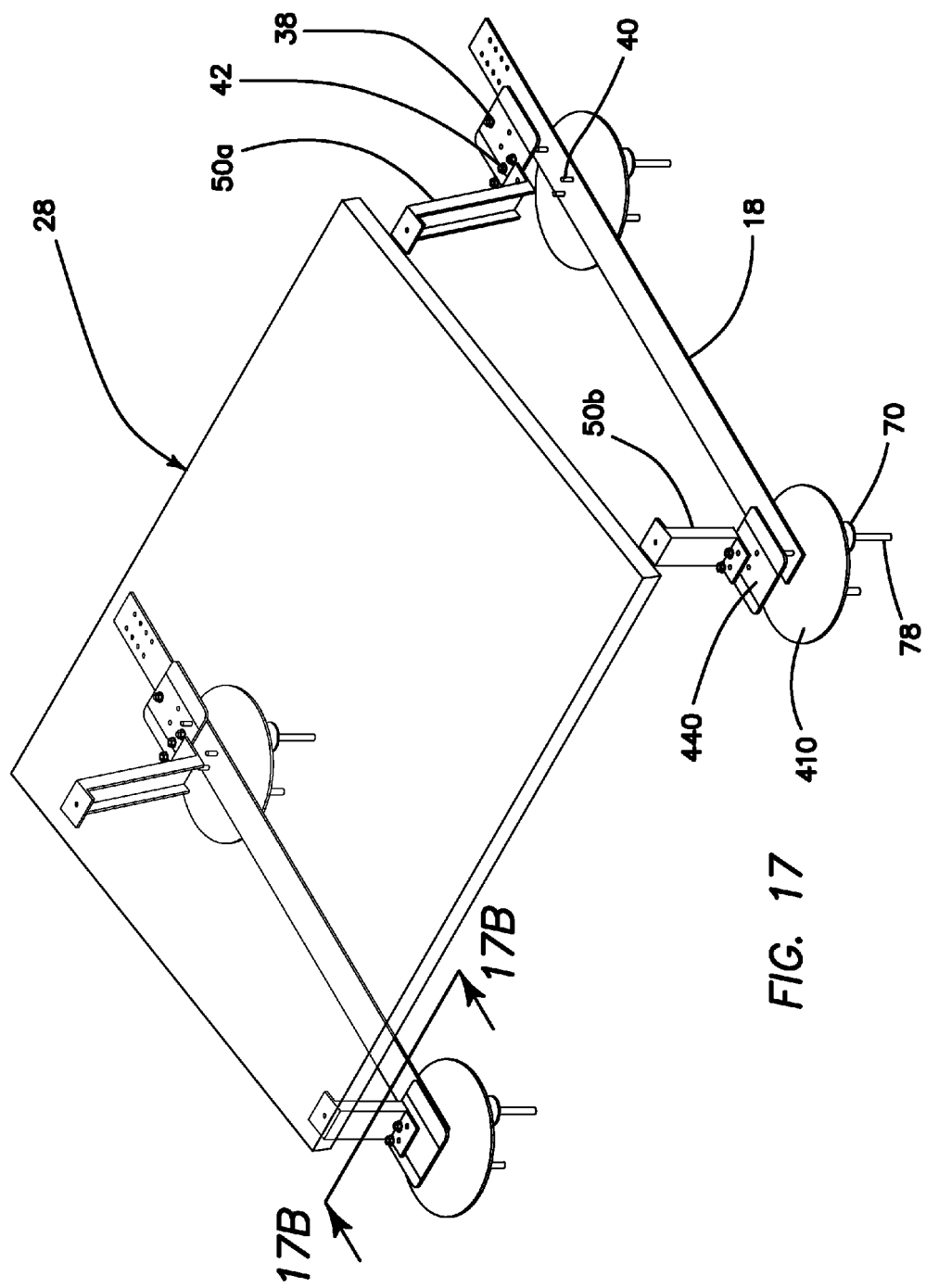
FIG. 17 is a three dimensional exploded view of the fourth embodiment used with circular seismic anchors.
Figure 17A:
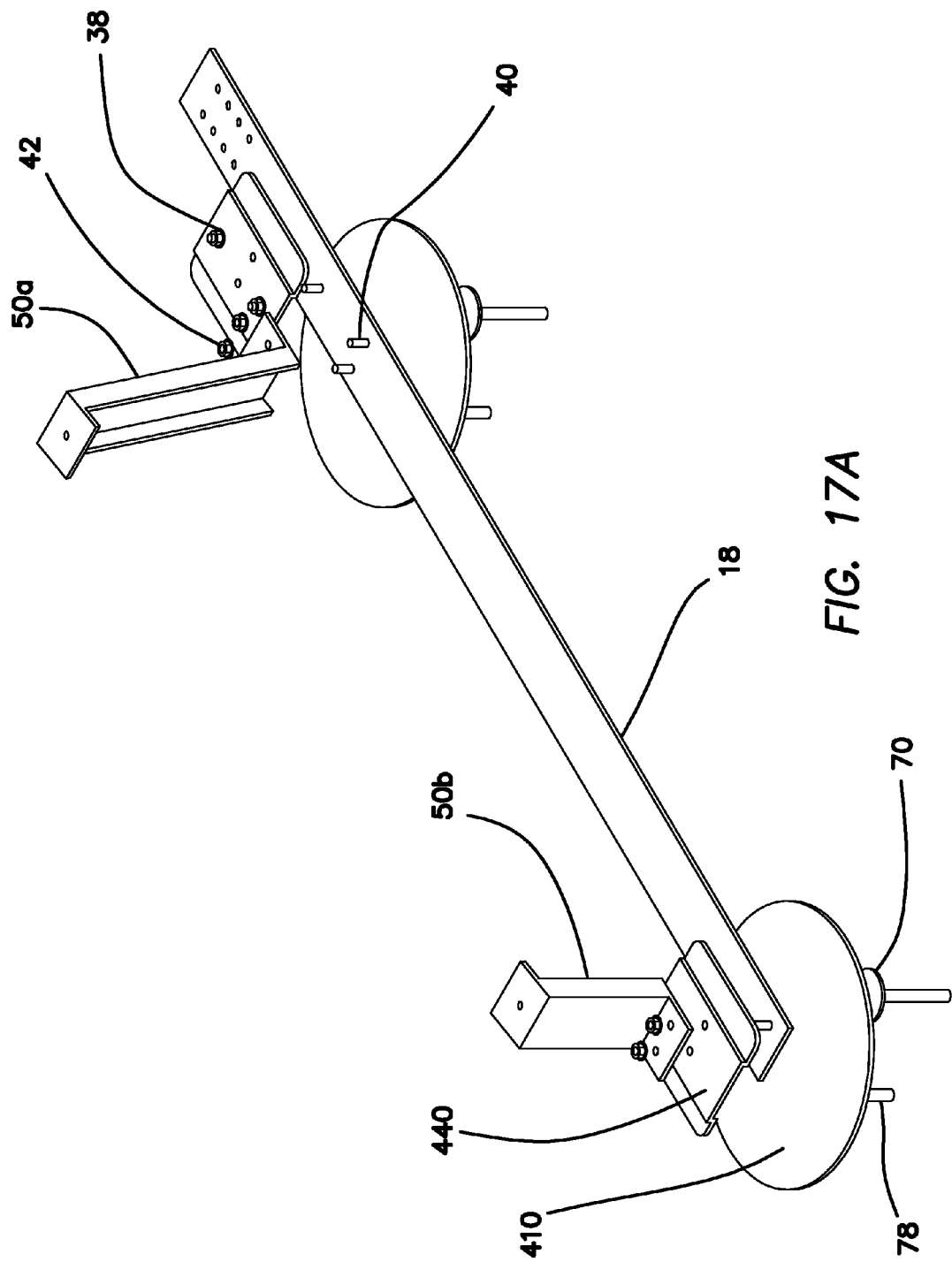
FIG. 17A is a closer view of FIG. 17.
Figure 17B:
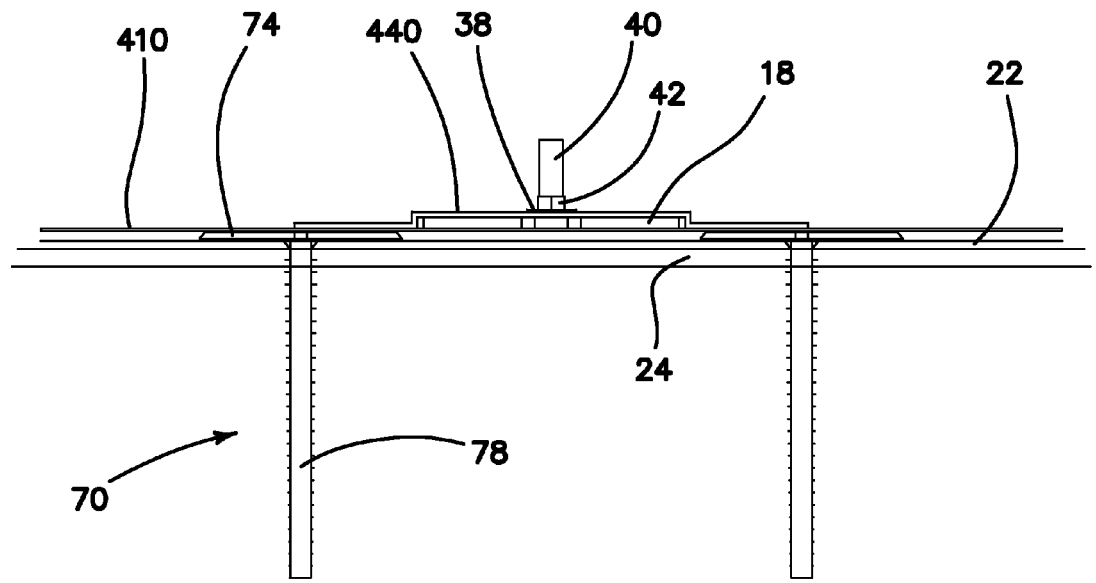
FIG. 17B is a cross section along the lines 17B-17B on FIG. 17 with parts assembled.

FIGS. 17, 17A and 17B illustrate the fourth embodiment 400 used with circular seismic anchors 70.

Figure 18B:
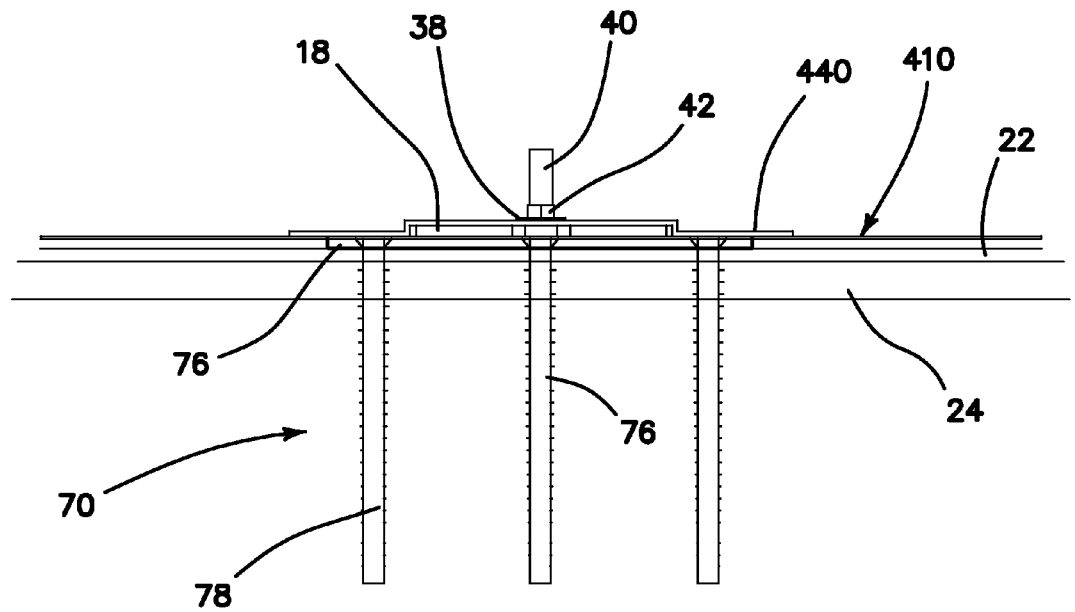
FIG. 18B is a cross section along the lines 18B-18B on FIG. 18 with parts assembled.
Figure 18:
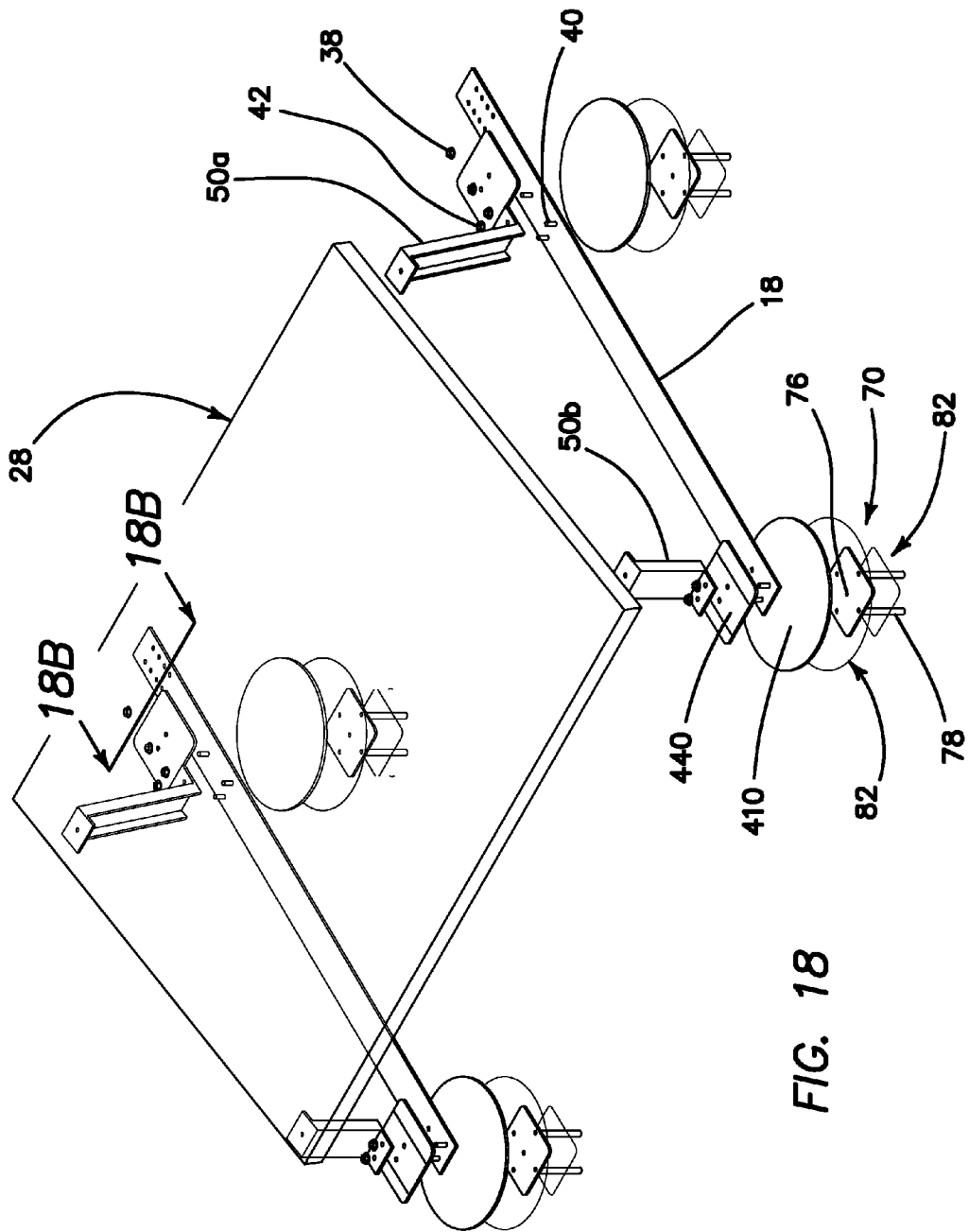
FIG. 18 is a three dimensional exploded view of the fourth embodiment used with rectangular seismic anchors.
Figure 18A:
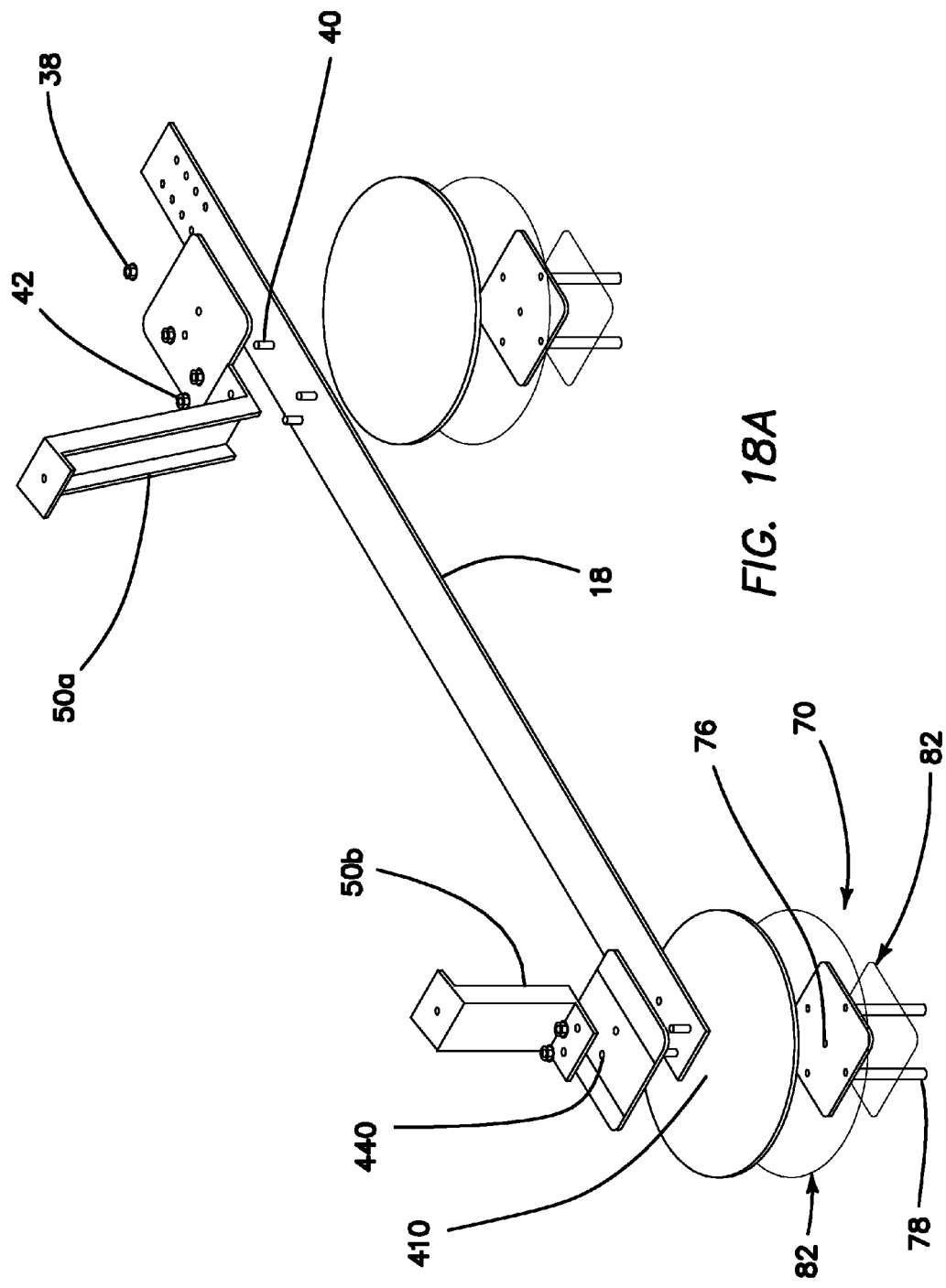
FIG. 18A is a closer view of FIG. 18.

FIGS. 18, 18A and 18B illustrate the fourth embodiment 400 used with rectangular seismic anchors 70.

Finally, the edges may be sealed with a waterproofing sealant in order to prevent entrance of water into this embodiment 400.

Fifth Embodiment

Figure 8:
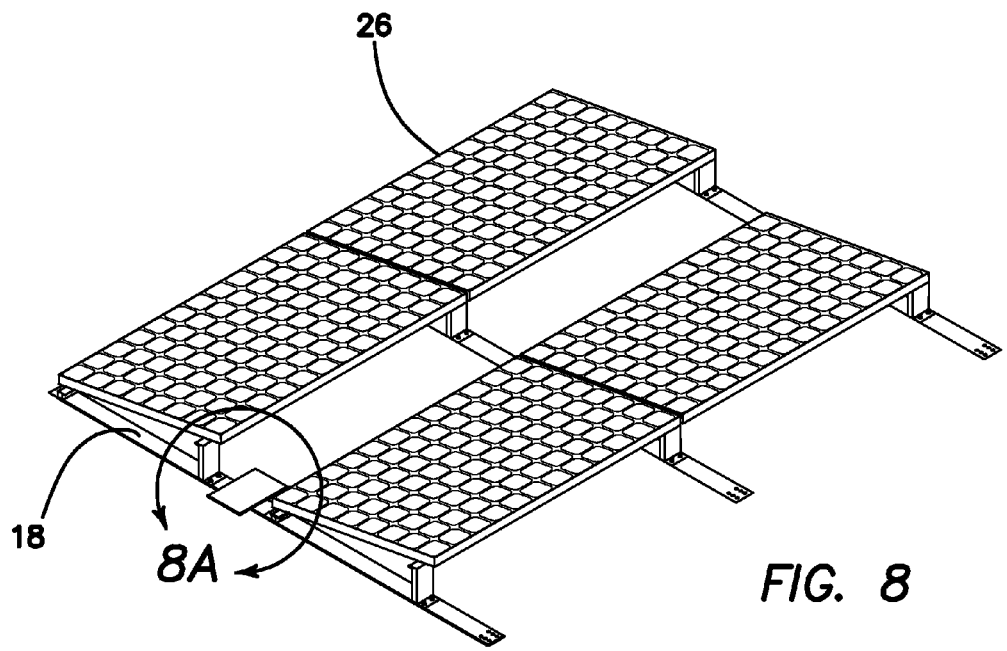
FIG. 8 is an isometric view of a fifth embodiment of this invention as used to fasten a mounting strap with brackets attached to angled solar panels.
Figure 8A:
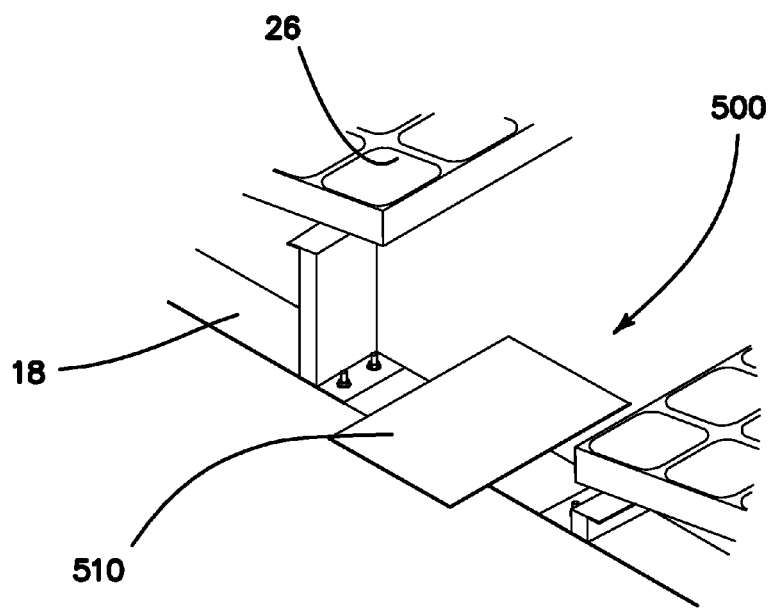
FIG. 8A is an enlarged view of the area annotated A on FIG. 8.

FIG. 8 is an isometric view of a fifth embodiment 500 of this invention as used to fasten a solar panel mounting strap 18 with angled solar panels 28 via support brackets 50. FIG. 8A is an enlarged view of the area annotated A on FIG. 8. As can be seen from these figures, the fifth embodiment comprises one strip 510, of weldable roofing material. It is perpendicular to across and above the strap 18. If the roof 22 is made of weldable material the strip 510 is welded to the roof 22. Otherwise the strip 510 is bonded to the roof 22 or fastened to the roof 22 with mechanical fasteners such as roofing nails, screws, lag bolts, etc. This traps the strap 18 between the strip 510 and the roof 22.

Figure 8B:
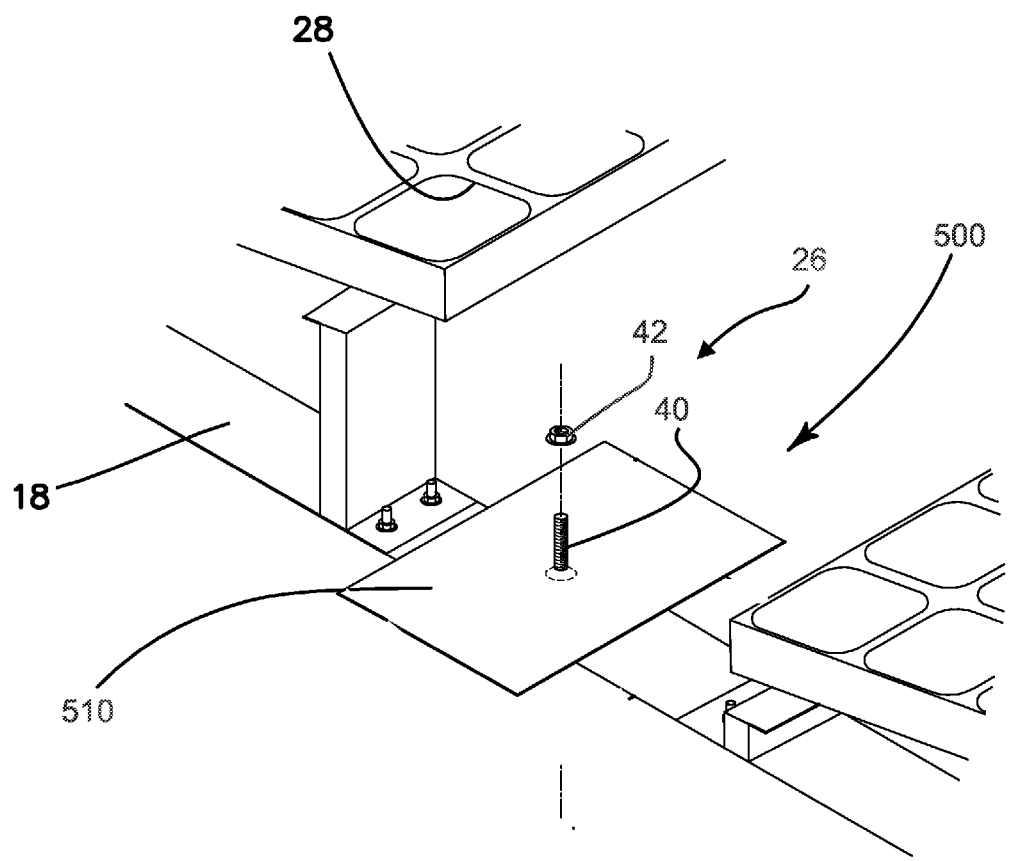
FIG. 8B is an isometric view of a fifth embodiment of this invention as used to fasten a mounting strap with brackets attached to angled solar panels and including a fastener fastening the strap to the top strip.

In addition there may be fastening systems 26 fastening the strap 18 to the strip 510. The preferred fastening systems 26 comprise a flush head, self-clinching threaded stud 40 clinched pointing upwards through a hole 32 (not visible) in the strap 18. The stud is a Pem Stud, available from Penn Engineering of Danboro, Pa., or equivalent. The stud 40 is long enough to pass through a hole 34 in the strip 510 where a washer 38 and nut 42 are screwed onto it thus securely fastening the second strip 130 to the strap 18. The nut 42 may be castellated and secured through a hole in the end of the stud 40 by a cotter pin, as is well known, to prevent rotation of the nut 42. The fifth embodiment is shown with a fastener 26 in FIG. 8B. An example of the fastening system is shown in FIG. 4C.

Finally, the edges may be sealed with a waterproofing sealant in order to prevent entrance of water into this embodiment 500.

Alternative for First Through Fifth Embodiments

Figure 9:
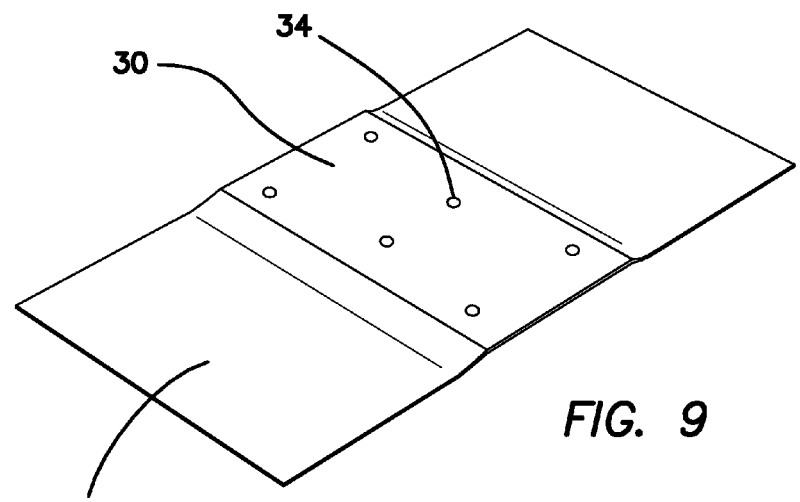
FIG. 9 is an isometric view of any of the first through the fifth embodiments of this invention reinforced with a top metal plate. For clarity the mechanical fasteners are not shown.
Figure 10:
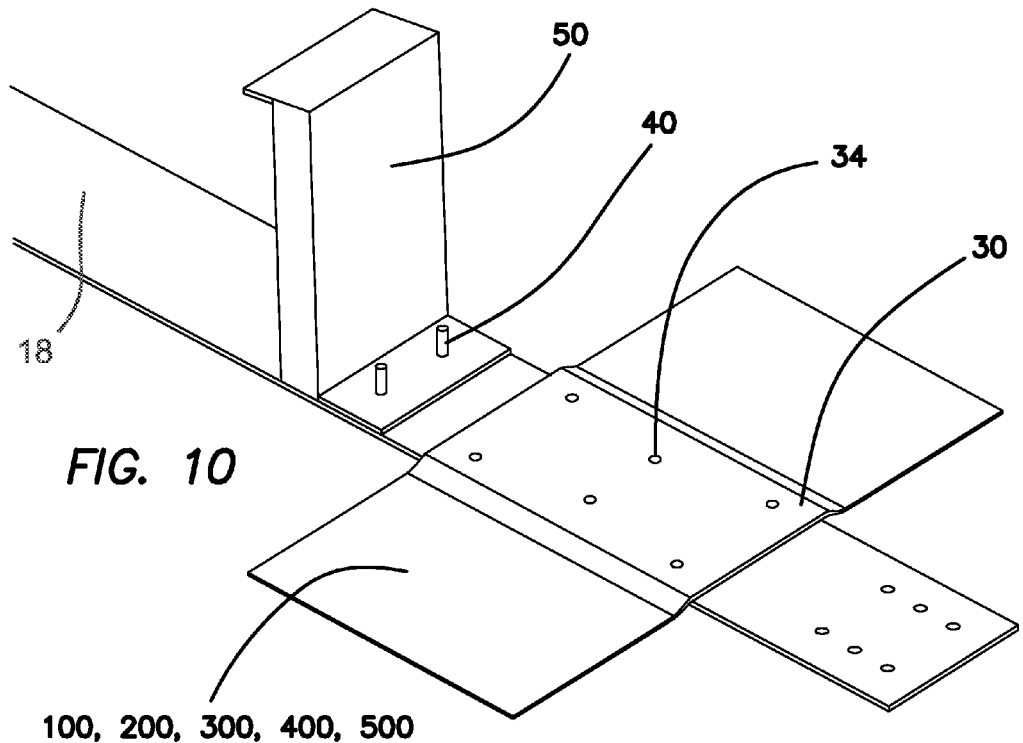
FIG. 10 is a close up, isometric view of the alternative shown in FIG. 9 as installed on a mounting strap. For clarity some mechanical fasteners are not shown.
Figure 11:
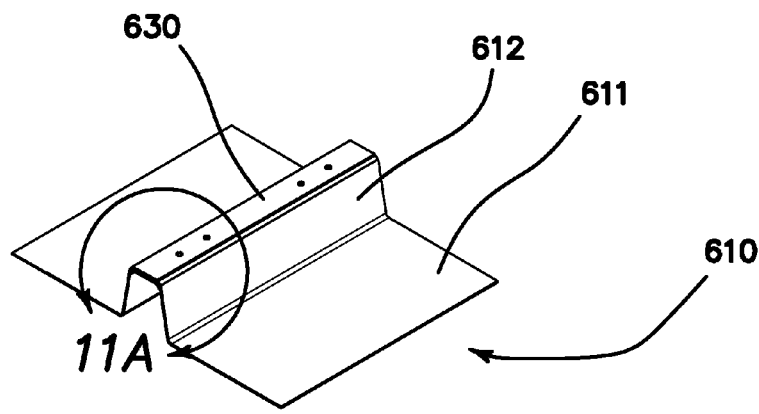
FIG. 11 is an isometric view of a sixth embodiment of this invention, which is intended to fasten rails or other structural members to a roof. For clarity the mechanical fasteners are not shown.
Figure 11A:
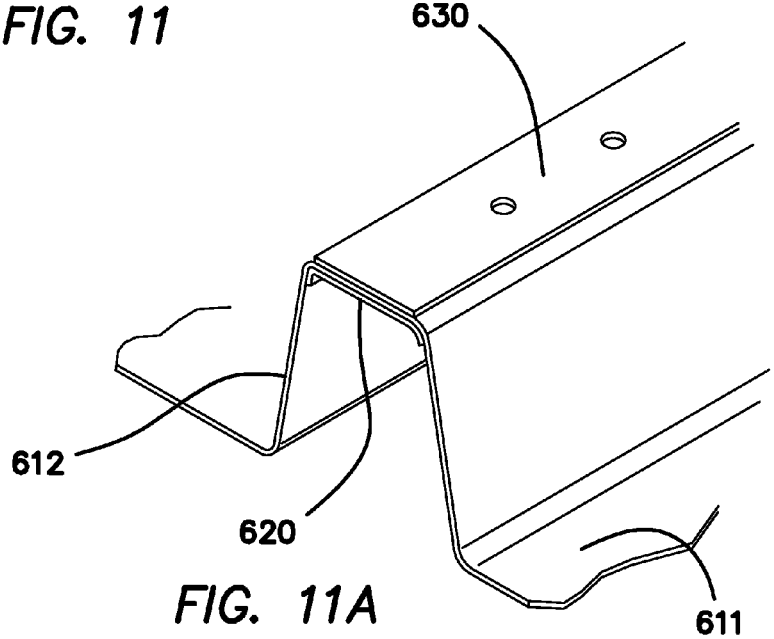
FIG. 11A is an enlarged view of the area annotated A on FIG. 11. For clarity the mechanical fasteners are not shown.
Figure 11B:
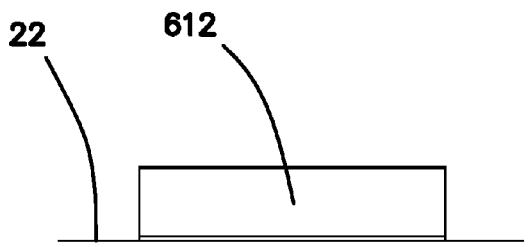
FIG. 11B is a side elevational view of the sixth embodiment. For clarity the mechanical fasteners are not shown.

FIG. 9 is an isometric view of any of the first through the fifth embodiments of this invention 100, 200, 300, 400, 500 reinforced with a top metal plate 30. FIG. 10 is a close up, isometric view of the alternative shown in FIG. 9 as installed on a solar panel mounting strap 18. If the top metal plate 30 is treated to be weldable to weldable roofing material it can be welded onto the other embodiments 100, 200, 300, 400, 500. Otherwise, it can be adhesively bonded to the other embodiments 100, 200, 300, 400, 500. Alternatively, it may be fastened with the same fastening systems 26 used in the assembly.

Sixth Embodiment

The sixth embodiment 600 of this invention is intended to fasten rails or other structural members 34 to a roof. Such devices have much more depth than a solar panel mounting strap 18. The sixth embodiment 600 can be seen in FIGS. 11, 11A-F and 12. The sixth embodiment 600 comprises a strip of roofing material 610 with a raised section 612 in the middle, surrounded by a lower section 611. The raised section 612 is intended to cross a structural member 64 perpendicularly. The raised section 612 has a top 614 which is larger than the width of the structural member 36. Above and below the top 614 are metal strips 620, 630. The lower strip 620 is sized and shaped to fit snugly over the top of the structural member. The upper strip 630 is sized and shaped to fit over the top 614.

The roofing material 610 is preferably weldable. If the roof 22 is made of weldable material then strip of roofing material 610 can be welded to the roof 22. The metal strips are preferably also coated with a weldable material. Then all the components of this embodiment 600 can be welded to each other. Otherwise they can be adhesively bonded to each other. Alternatively, they can be fastened to each other and the structural member with fasteners 26 as previously described and illustrated. If not, the strip 610 can be adhesively bonded to the roof 22 or attached with fasteners 26 or weighted down with ballast 46.

Finally, the edges may be sealed with a waterproofing sealant in order to prevent entrance of water into this embodiment 600.

Seventh Embodiment

The seventh embodiment 700 of this invention is intended to fasten straps 18 to a roof 22. The seventh embodiment 700 can be seen in the FIGS. 13, 13A, 13B, 13C, 13D, 13E and 14. The seventh embodiment 700 comprises a strip of roofing material 710 with a raised section 712 in the middle. The raised section 712 is intended to cross a strap 18 perpendicularly. The raised section 712 has a top 714 which is larger than the width of the strap 18. Above and below the top 714 are metal strips 720, 730. The lower strip 720 is sized and shaped to fit snugly over the top of the strap 18. The upper strip 730 is sized and shaped to fit the top 714.

The roofing material 710 is preferably weldable. The metal strips are preferably also coated with a weldable material. Then all the components of this embodiment 700 can be welded to each other. Otherwise they can be adhesively bonded to each other. Alternatively, they can be fastened to each other and the structural member with fasteners 26 as previously described and illustrated. If the roof 22 is made of weldable material then strip of roofing material 710 can be welded to the roof 22. If not, the strip 710 can be adhesively bonded to the roof 22 or attached with fasteners 26 as previously described and illustrated.

Finally, the edges may be sealed with a waterproofing sealant in order to prevent entrance of water into this embodiment 700.

Usage Examples

Figure 12:
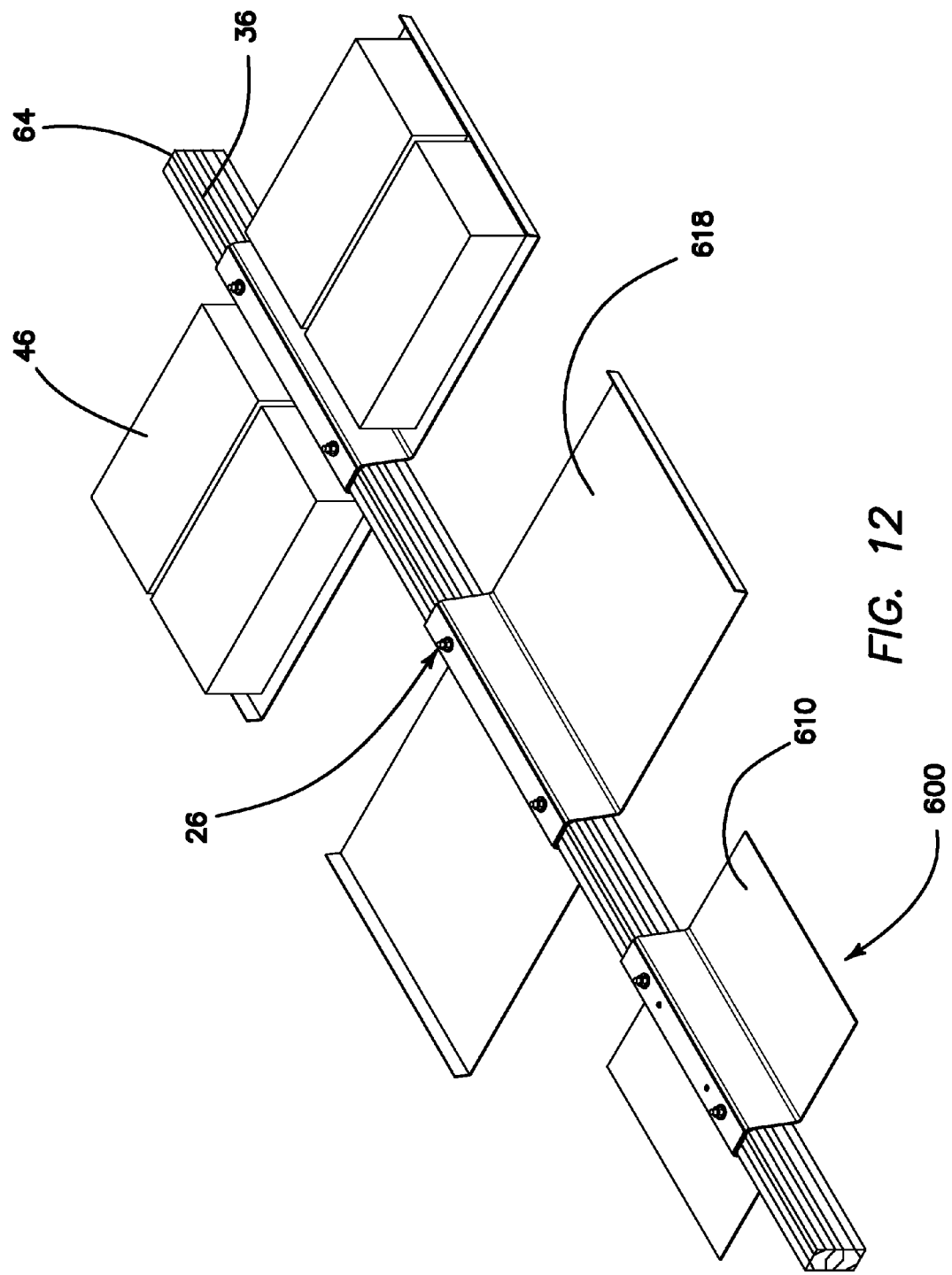
FIG. 12 shows the sixth embodiment used to fasten a structural member to a roof. It also shows a variation of this sixth embodiment incorporating ballast trays.
Figure 13:
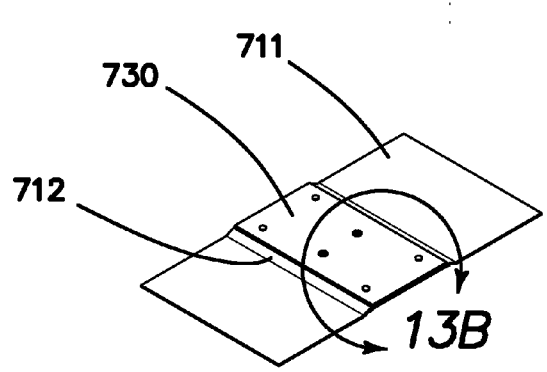
FIG. 13 is an isometric view of a seventh embodiment of this invention. For clarity the mechanical fasteners are not shown.
Figure 13A:
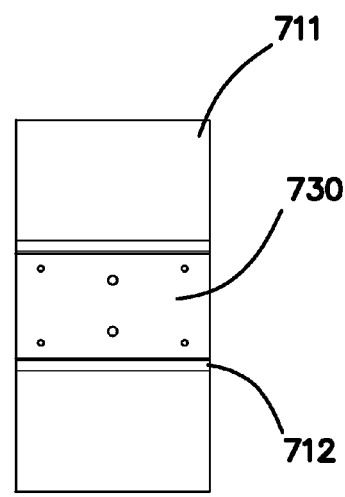
FIG. 13A is a top view of the seventh embodiment. For clarity the mechanical fasteners are not shown.
Figure 13B:
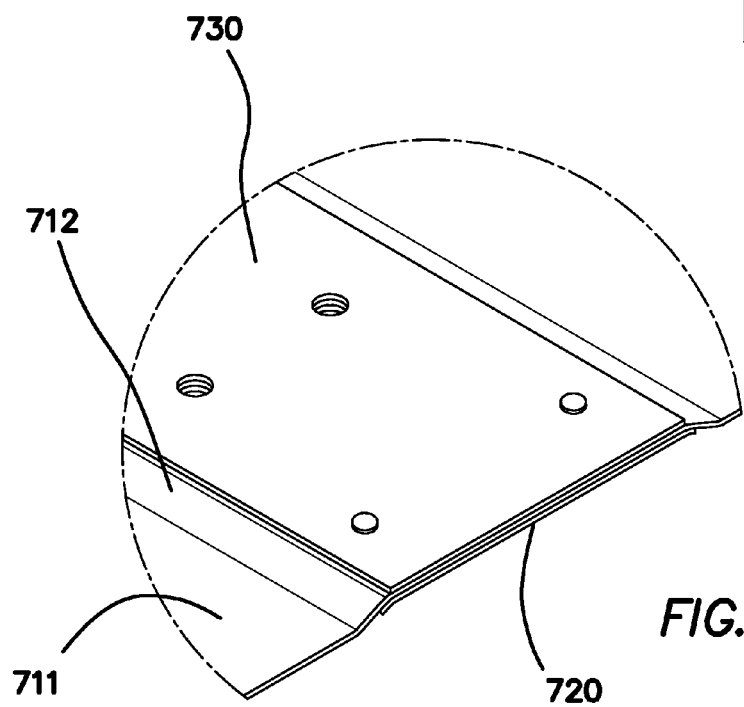
FIG. 13B is an enlarged view of the area annotated B on FIG. 13. For clarity the mechanical fasteners are not shown.

FIG. 12 shows the sixth embodiment 600 used to fasten a structural member 36 to a roof 22. In this case the embodiment 600 is attached to the member with fasteners 26. FIG. 12 also illustrates the alternative way of holding down this embodiment: ballast trays 618. The trays 618 are shaped to hold the member 36 down to a roof 22. In this case hold down is achieved with ballast 46.

Figure 14:
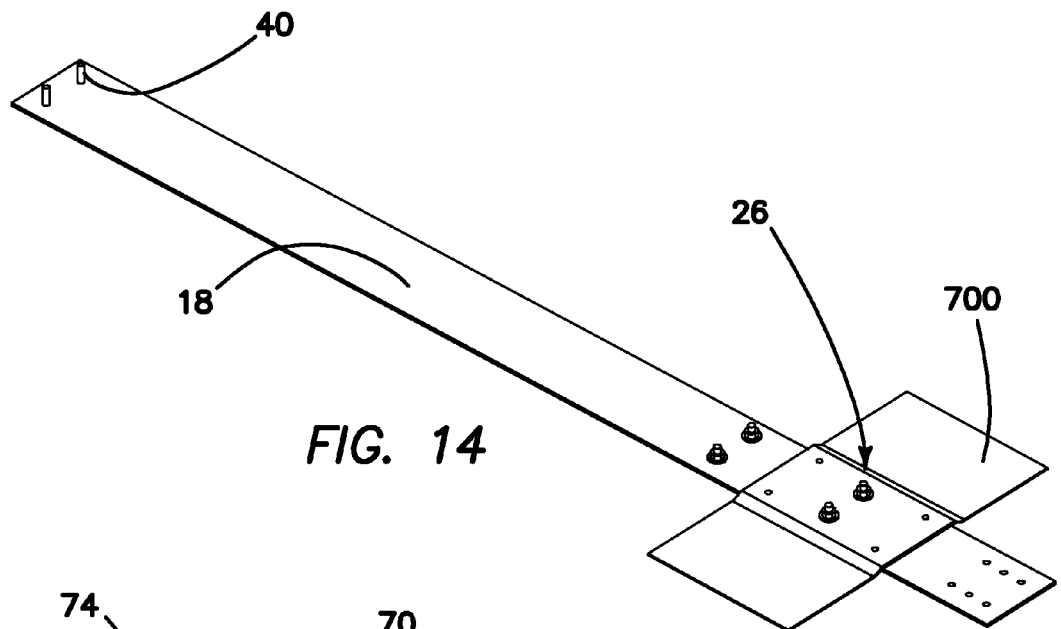
FIG. 14 is an isometric view of the seventh embodiment in use to fasten a strap to a roof. For clarity the panel support brackets are not shown. See U.S. Pat. Nos. 7,814,899 and 8,870,139, and PCT Patent Application No. PCT/US2013/025622 for examples of the usage of straps in mounting of solar panels.

FIG. 14 is an isometric view of the seventh embodiment 700 in use to fasten a solar panel mounting strap 18 to a roof 22.

Figure 15:
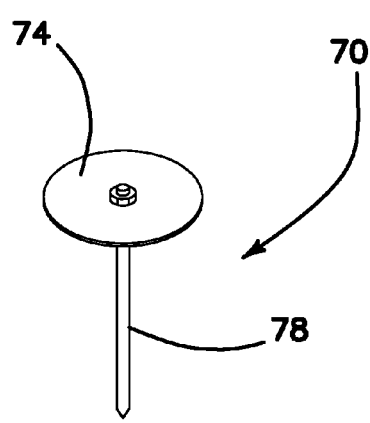
FIG. 15 is an isometric view of a seismic anchor.

FIG. 15 is an isometric view of a seismic anchor 70. A seismic anchor 70 is a metal washer, of minimum 2" diameter 74 and a self-tapping ¼" screw 78, with length sufficient to adequately penetrate the roof 22. The screw 78 is inserted through the hole in the center of the washer 74. The metal may be treated to be weldable to weldable roofing material. An alternate embodiment using a seismic plate 76 is illustrated in FIGS. 18, 18A, 19, and 19A. This embodiment comprises a seismic plate 76, with, preferably, two screws 78 through it which screw through the roof 22 and into the substrate or a roof rafter. The plate 76 is made of metal, which may be treated to be weldable to weldable roofing material.

The sixth 600 or seventh 700 embodiments are placed over a structural member 36 or strap 18 on the roof 22. One side of the embodiment is raised and a seismic anchor 70 fully installed in the roof 22 near middle of the flap. Raising parts of the embodiments is possible because they are made out of roofing material which is flexible. Next the roofing material is welded to the top of the washer 74 and welded to the roof 22. If additional support is needed a second seismic anchor 70 can be installed under the other side. Finally, the edges may be sealed with a waterproofing sealant in order to prevent entrance of water into the sixth 600 and seventh 700 embodiments.

Figure 15A:
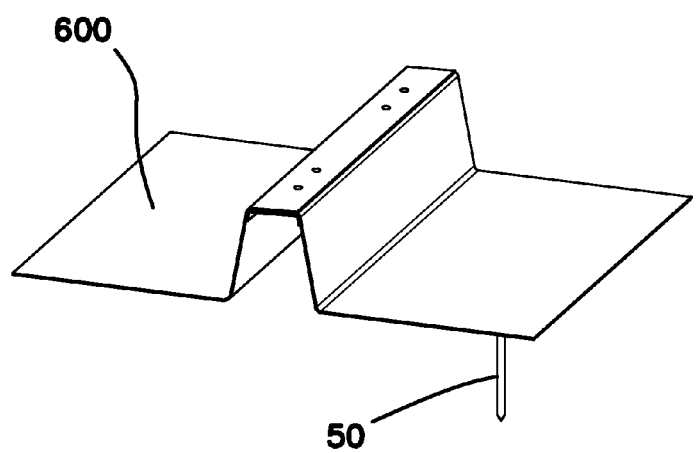
FIG. 15A is a top isometric view of the sixth embodiment used with a seismic anchor. For clarity the mechanical fasteners are not shown.

FIG. 15A is a top isometric view of the sixth embodiment 600 fastened down with a seismic anchor 70.

Figure 15B:
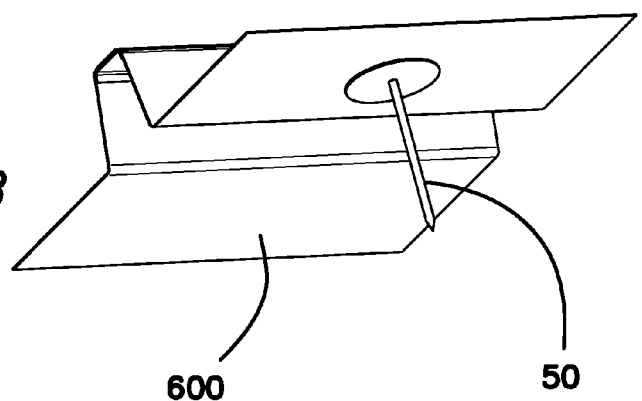
FIG. 15B is a bottom isometric view of the sixth embodiment used with a seismic anchor. For clarity the mechanical fasteners are not shown.

FIG. 15B is a bottom isometric view of the sixth embodiment 600 fastened down with a seismic anchor 70.

Figure 15C:
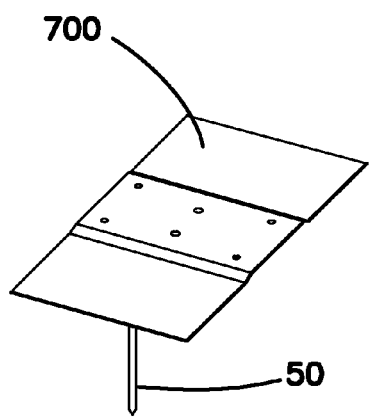
FIG. 15C is a top isometric view of the seventh embodiment used with a seismic anchor. For clarity the mechanical fasteners are not shown.

FIG. 15C is a top isometric view of the seventh embodiment 700 fastened down with a seismic anchor 70.

Figure 15D:
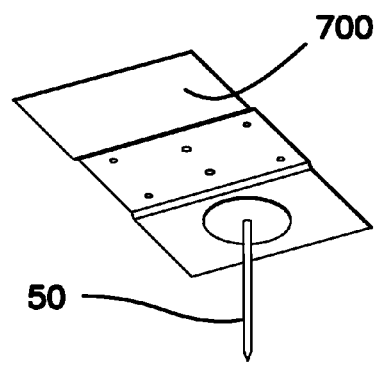
FIG. 15D is a bottom isometric view of the seventh embodiment used with a seismic anchor. For clarity the mechanical fasteners are not shown.

FIG. 15D is a bottom isometric view of the seventh embodiment 700 fastened down with a seismic anchor 70.

Eighth Embodiment

Figure 19:
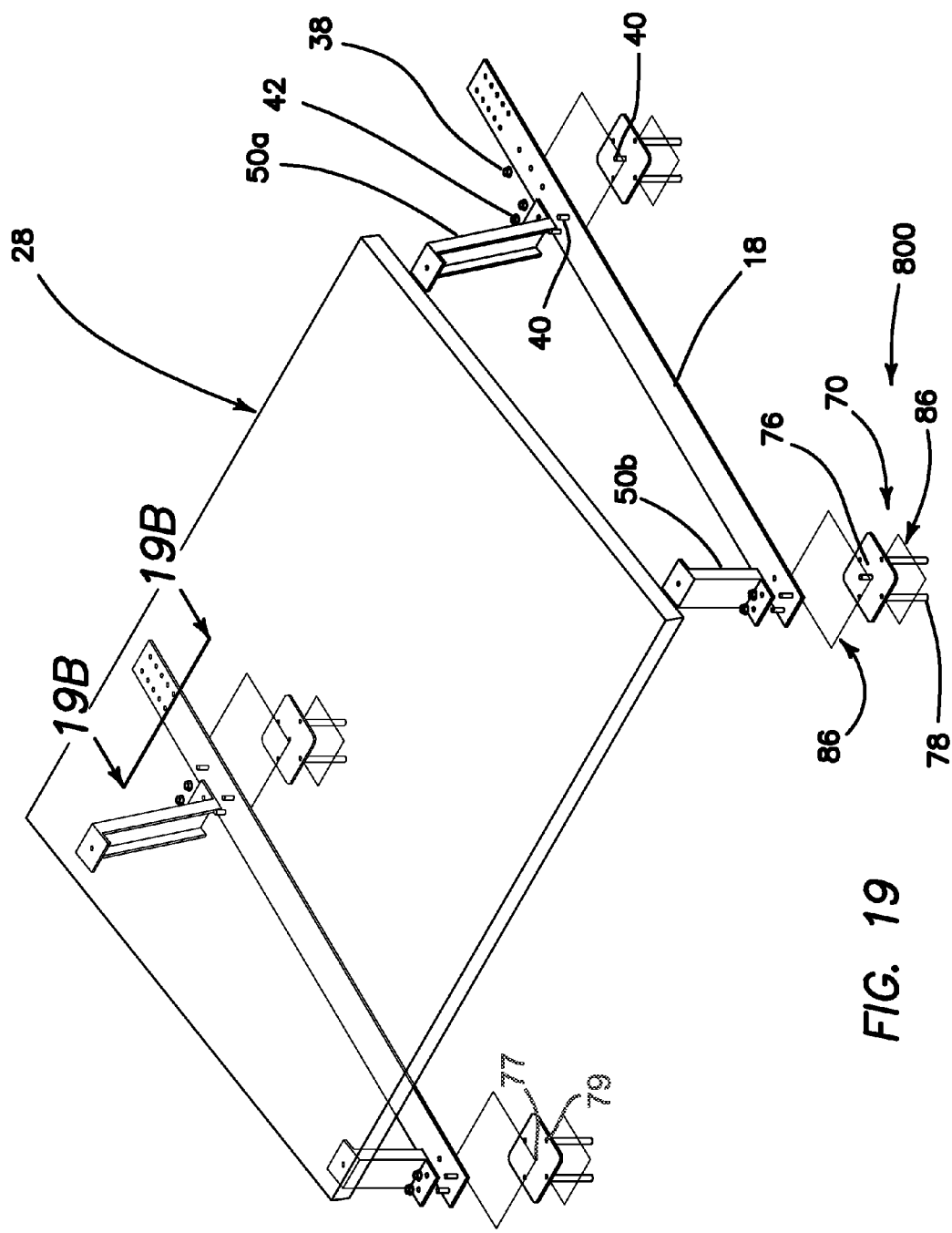
FIG. 19 is a three dimensional exploded view of an eighth embodiment used with rectangular seismic anchors and latex roof coating.
Figure 19A:
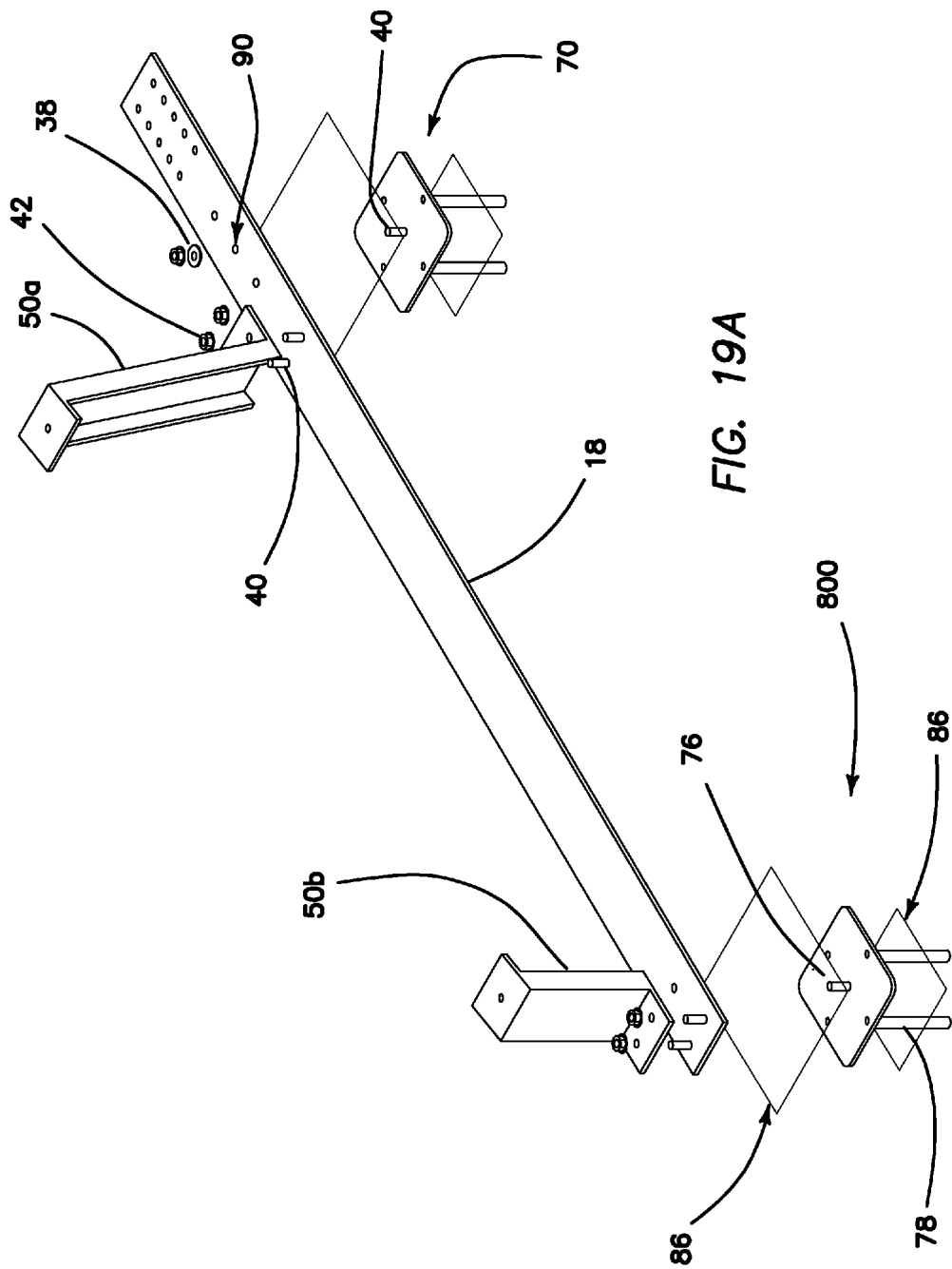
FIG. 19A is a closer view of FIG. 19.
Figure 19B:
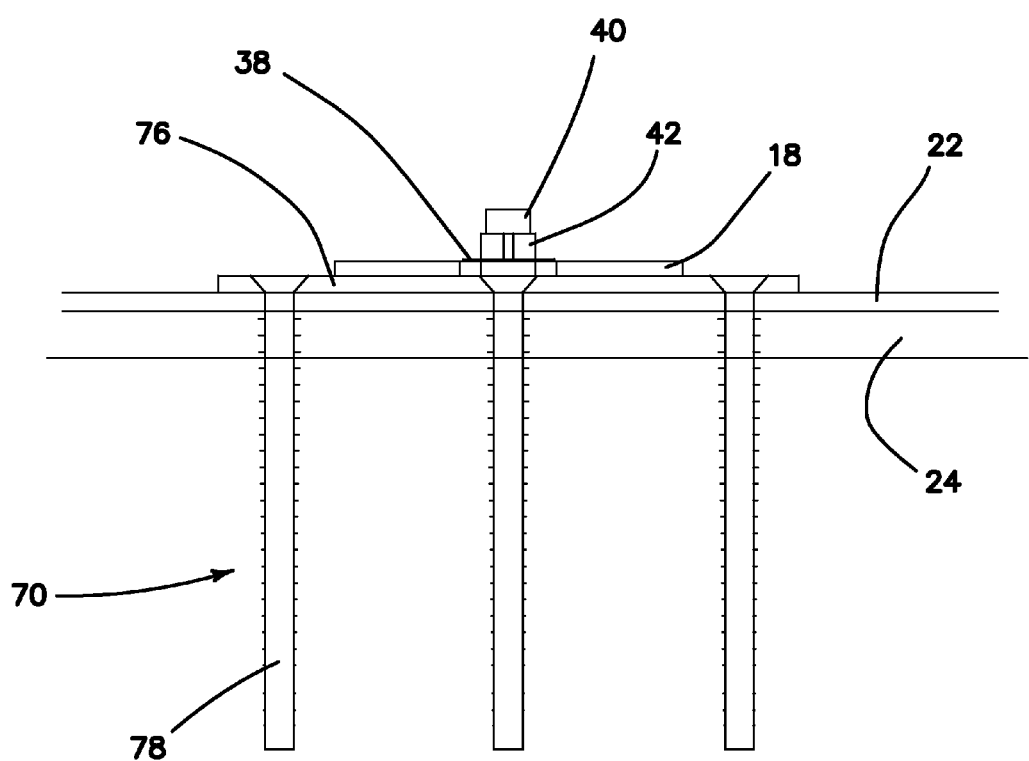
FIG. 19B is a cross section along the lines 19B-19B on FIG. 19 with the parts assembled.

The eighth embodiment 800 is shown in FIGS. 19, 19A and 19B. The eighth embodiment 800 comprises a seismic plate 76 including a stud 40 pointing upwards, below the strap 18, which is modified with a hole 90 for allowing the stud 40 to pass through. Screws 78 through the plate 76 fasten the plate 76 to the roof substrate or a roof rafter. Between the roof 22 and the plate 76 and between the plate 76 and the strap is placed a layer of elastomeric roof coating 86. Such coatings are energy efficient, high quality coating systems that consist of a layered, watertight blanket of elastomeric roof coatings, encapsulating a fabric. The elastomeric coatings can be acrylic or silicone polymers. Metacrylics® Energy Efficient Coatings for Commercial Properties, available from Metacrylics of Gilroy, Calif., or equivalent can be used. After assembly in the proper order as shown in FIGS. 19 and 19A, tightening the nut 42 on the stud 40 causes the elastomeric layers to compress, which provides a positive seal, and which prevents moisture from entering the interfaces and percolating down the screws.

The method of fabricating embodiment 100 comprises the steps of:

a. providing a first strip 110 of roofing material, having two ends 114, 112, two sides, a length and a width;

b. placing the first strip 110 under the solar panel mounting strap 18, perpendicularly crossing the solar panel mounting strap 18;

c. fastening the first strip 110 to the roof 22 by a first fastening method;

d. providing a metal plate 120, smaller than the first strip 110, e. placing the metal plate 120 on top of the first strip 110 and next to the solar panel mounting strap 18;

f. screwing the metal plate 120 through the first strip 110 and the roof 22, and through the roof and into a roof substrate or into a roof rafter;

g. providing a second strip 130 of roofing material, having two ends 134, 138, two sides, a width similar to the width of the first strip 110, and a length about half the length of the first strip 110 h. placing the second strip 130 perpendicularly crossing the solar panel mounting strap 18, above the solar panel mounting strap, lined up end 134 to end 114 with one end 114 of the first strip 110;

i. fastening the second strip 130 to the first strip 110 by a second fastening method;

j. providing a third strip 140 of roofing material, having a width similar to the first strip 110, two ends 144, 148 and two sides, but of length about half that of the first strip 110, k. placing the third strip 140 perpendicular to the solar panel mounting strap 18, lined up end 148 to end 112 with the other end 112 of the first strip 110; and l. fastening the third strip 140 to the first strip 110 and metal plate 120 by a third fastening method; whereby the metal plate 120 is encapsulated;

m. whereby the metal plate 120 is in the same plane as the solar panel mounting strap 18 and the second 130 and third 140 strips may be co-planar.

The ends and sides may be straight lines or curves and the second 130 and third 140 strips may be overlapped The method may further comprise the steps of:
a. providing a top metal plate 30; and
b. fastening the top metal plate 30 to and above the first 130 and/or third 140 strips by a fourth fastening method.

The fastening methods may be adhesive bonding or fastening with a fastener. Alternatively, if the first strip 110 and roof 22, or first strip 110 and second strip 130 are made of weldable material; or if the first strip 110 and second strip 130 are made of weldable material and the metal plate 120 is treated to be weldable to weldable roofing material; or if the top metal plate 30 is treated to be weldable to weldable roofing material and the first 130 and third 140 strips are made from weldable roofing material; by welding;

The method of fabricating embodiment 200 comprises the steps of:
a. providing a metal plate 220 having a top 224 and a bottom 226;
b. placing the metal plate 220 next to a solar panel mounting strap 18;
c. fastening the metal plate 220 to the roof 22 by a first fastening method;
d. screwing the metal plate through the roof 22 into a roof rafter;
e. providing a first strip 230 of roofing material, larger than the metal plate 220, having a width and four edges;
f. fastening the first strip 230 to the top 224 and the roof by a second fastening method, perpendicular to and next to the solar panel mounting strap 18;
g. providing a second strip 240 of roofing material having a width similar to the width of the first strip 230 and four edges;
h. placing the second strip 240 perpendicular to and crossing the solar panel mounting strap 18, in line with and overlapping the first strip 230; and
i. fastening the second strip 240 to the roof 22 and the first strip 230 by a third fastening method;
j. whereby the metal plate 220 is in the same plane as the solar panel mounting strap.

The ends and sides may be straight lines or curves.
The method 200 may further comprise the steps of:
a. providing a top metal plate 30; and
b. fastening the top plate 30 to and above the first 230 and/or second 240 strips by a fourth fastening method.

The fastening methods are adhesive bonding; or, if the bottom 226 is treated to be weldable to weldable roofing material and the roof 22 is made of weldable roofing material; or the top 224 is treated to be welded to weldable roofing material, and the first strip 230 and the roof 22 are made of weldable roofing material; or, if the roof 22, first strip 230 and second strip 240 are made of weldable roofing material; welding.

The method of fabricating embodiment 300 comprises the steps of:
a. providing a first strip 310 of roofing material;
b. placing the first strip 310 next to and perpendicular to the solar panel mounting strap 18;
c. fastening the first strip 310 to the roof 22 by a first fastening method;
d. providing a metal plate 320, smaller than the first strip 310;
e. placing the metal plate 320 on top of the first strip 310 and next to the solar panel mounting strap 18;
f. screwing the metal plate 320 through the first strip 310 and the roof 22, and into a roof rafter;
g. providing a second strip 330 of roofing material of the same size as the first strip 310;
h. placing the second strip 330 perpendicular to and next to the solar panel mounting strap 18, lined up in vertical registration with the first strip 310;
i. fastening the second strip 330 to the first strip 310 by a second fastening method; whereby the metal plate 320 is encapsulated;
j. providing a third strip 340 of roofing material of the same size as the first strip 310;
k. placing the third strip 340 perpendicular to and crossing the solar panel mounting strap 18, interleaved between the first 310 and second 330 strips or overlapping the second strip 330; and
l. fastening the third strip 340 to the roof 22 and the first 310 and second 330 strips or the second strip 330 by a third fastening method.

The ends and sides are straight lines or curves.
The method 300 may further comprise the steps of:
a. providing a top metal plate 30;
b. fastening the top plate 30 to and above the second 330 and/or third 340 strips by a fourth fastening method.

The fastening method may be adhesive bonding; or, if the roofing 22 and strip 310 are made of weldable roofing material; or, if the first strip 310 and the second strip 330 are made of weldable roofing material; or, if the roof 22, the first strip 310, the second strip 330 and the third strip 340 are made of weldable roofing material; or, if the top metal plate 30 is treated to be weldable to weldable roofing material and the first 310 and third 340 strips are made from weldable roofing material; welding.

The method of fabricating embodiment 400 comprises the steps of:
a. providing a first strip 410 of roofing material having edges;
b. placing the first strip 410 perpendicular to and crossing the solar panel mounting strap 18, below the solar panel mounting strap 18;
c. fastening the first strip 410 to the roof 22 by a first fastening method;
d. providing a second strip 440 of roofing material having edges; the second strip 440 being the same size as the first strip 410;
e. placing the second strip 440 perpendicular to and crossing the solar panel mounting strap 18, above the solar panel mounting strap 18; and f. fastening the first 410 and second 440 strips to each other by a second fastening method; whereby the solar panel mounting strap 18 is encapsulated between the first 410 and second 440 strips.

The ends and sides may be straight lines or curves.

The method 400 may further comprise the steps of:
a. providing a top metal plate 30; and
b. fastening the top plate 30 to and above the second strip 440 by a third fastening method.

The first fastening methods may be adhesive bonding, fastening with a fastener; or, if the first strip 410 and the roof 22 are made of weldable roofing material; or, if the first 410 and second 440 strips are made of weldable roofing material; or, if the top metal plate 30 is treated to be weldable to weldable roofing material and the second strip 440 is made from weldable roofing material; welding.

The method of fabricating embodiment 500 comprises the steps of:
a. providing a strip 510 of roofing material having edges;
b. placing the strip 510 perpendicular to and crossing the solar panel mounting strap 18, above the solar panel mounting strap 18; and
c. fastening the strip 510 to the roof 22 by a fastening method; whereby the solar panel mounting strap 18 is encapsulated between the strip 510 and the roof
d. providing a top metal plate 30; and
e. fastening the top plate 30 to and above the strip 510 by a second fastening method.

The second fastening method may be adhesive bonding; fastening with a fastener; or, if the top metal plate 30 is treated to be weldable to weldable roofing material and the strip 510 is made from weldable roofing material, welding.

Alternatively, the method of fabricating embodiment 500 may comprise the steps of:
a. providing a strip 510 of roofing material having edges; the ends and sides being straight lines or curves;
b. placing the strip 510 perpendicular to and crossing the solar panel mounting strap 18, above the solar panel mounting strap 18; and
c. fastening the strip 510 to the roof 22 by a fastening method; whereby the solar panel mounting strap 18 is encapsulated between the strip 510 and the roof
d providing a top metal plate 30; and
e fastening the top plate 30 to and above the strip 510 by a second fastening method.

The first fastening method is adhesive bonding; fastening with a fastener; or, if the strip 510 is made from weldable roofing material, welding. The second fastening method is adhesive bonding; fastening with a fastener; or, if the top metal plate 30 is treated to be weldable to weldable roofing material and the strip 510 is made from weldable roofing material, welding. The edges may be straight lines or curves. As a consequence of this construction, the solar panel mounting strap 18 is encapsulated between the strip 510 and the roof.

A further method of fabricating embodiment 500 comprises the steps of:
a. providing a strip 510 of roofing material having edges; the ends and sides being straight lines or curves;
b. placing the strip 510 perpendicular to and crossing the solar panel mounting strap 18, above the solar panel mounting strap 18; and
c. fastening the strip 510 to the roof 22 by a fastening method;
the fastening method being adhesive bonding; fastening with a fastener; or, if the strip 510 and the roof are made of weldable roofing material, welding;
whereby the solar panel mounting strap 18 is encapsulated between the strip 510 and the roof;
d providing a top metal plate 30; and
e fastening the top plate 30 to and above the strip 510 by a second fastening method.

The edges may straight lines or curves. The fastening method is adhesive bonding, fastening with a fastener, or welding, if the strip 510 and the roof 22 are made of weldable roofing material. The solar panel mounting strap 18 is, thus, encapsulated between the strip 510 and the roof.

The second fastening method may be adhesive bonding; fastening with a fastener; or, if the top metal plate 30 is treated to be weldable to weldable roofing material and the strip 510 is made from weldable roofing material, welding.

Referring to FIGS. 19, 19A and 19B, fastening system 800 for fastening a solar panel mounting strap 18, which is modified with a through hole 90 to a roof 22 comprises:
a. a first layer of elastomeric roof coating 86 placed on the roof 22 below the solar panel mounting strap 18;
b. a seismic plate 76, having a medial hole 77 and a peripheral hole 79, positioned on the first layer;
c. a stud 40 inserted pointing upwards through the medial hole 77; the stud passing through the hole 90 so that the threaded portion protrudes above the solar panel mounting strap 18;
d. a screw 78 through the peripheral hole 79 fastening the plate 76 to the roof substrate or a roof rafter;
e. a second layer of elastomeric roof coating 86 positioned between the mounting solar panel mounting strap 18 and the seismic plate 76;
f. a nut 42 screwed down on the protruding portion so that the layers are compressed;

This construction ensures a positive seal, which prevents moisture from entering the interfaces and percolating down the screw.

The method of fabricating embodiment 800 of fastening a solar panel mounting strap 18, which is modified with a through hole 90 to a roof 22 comprises the steps of:
a. providing a seismic plate 76 made by the steps of:
b. providing a metal plate 76, having a medial hole 77 and a peripheral hole 79;
c. providing a stud 40;
d. inserting the stud 40 through the medial hole;
f. placing a first layer of elastomeric roof coating 86 on the roof 22 below the solar panel mounting strap 18;
g. placing the seismic plate 76 on the first layer with the stud 40 facing upwards;
h. providing a screw 78;
i. screwing screw 78 through the peripheral hole, through the first layer and into to the roof substrate or a roof rafter;
j. placing a second layer of elastomeric roof coating 86 on top of the seismic plate 76;
k. placing the solar panel mounting strap on the second layer so that:
  i. the stud 40 passes through the second layer and the through hole 90;
  ii. and the threaded portion protrudes above the solar panel mounting strap;
l. providing a nut 42:
m. screwing the nut 42 down on the protruding portion so that the layers are compressed;

This construction provides a positive seal, which prevents moisture from entering the interfaces and percolating down the screw.

Figure 7B:
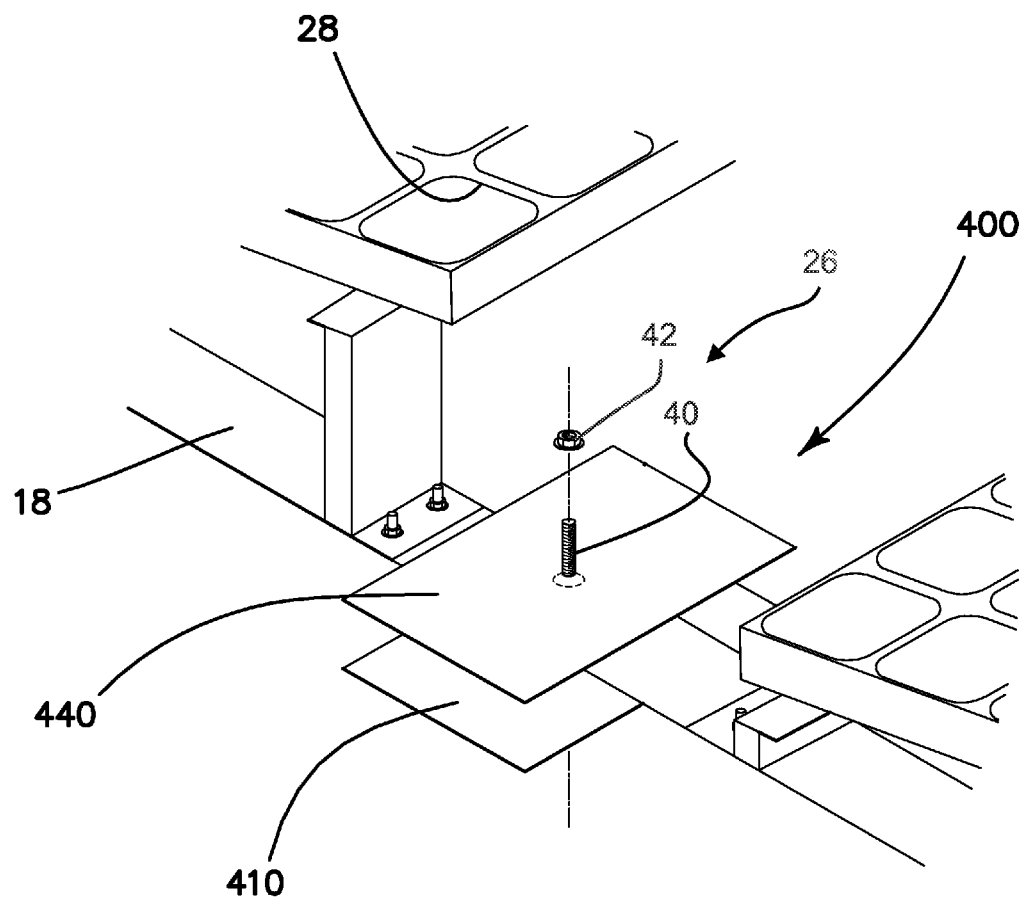
FIG. 7B is an isometric view of a fourth embodiment of this invention as used to fasten a mounting strap with brackets attached to angled solar panels and including a fastener fastening the strap to the top strip.

As shown on FIG. 7B a first alternative to embodiment 400 comprises:

a. a first strip 440 of roof material longer than the solar panel mounting strap 18 is wide placed perpendicularly across the solar panel mounting strap 18;

b. a second strip of roof material longer than the solar panel mounting strap 18 is wide placed perpendicularly under the solar panel mounting strap 18 and adhered to the roof 22 and the first strip 440 by adhesive bonding or welding.

This first alternative embodiment may further comprise:

a. a first hole through the solar panel mounting strap 18;

b. a second hole through the first strip;

c. a stud 40 inserted pointing upwards through the holes so that a threaded portion thereof protrudes above the solar panel mounting strap; and d. a nut 42 on the protruding portion, fastening the solar panel mounting strap 18 and first strip 440 together.

An alternative embodiment to embodiment 500 comprises:

a. a strip 510 of roof material longer than the solar panel mounting strap 18 is wide placed perpendicularly across the solar panel mounting strap 18;

b. a seismic anchor 70 or seismic plate 76 screwed by a screw 78 into the roof substrate or a roof joist; each of the seismic anchor 70 and seismic plate 76 having a top metal plate; the top surface of the seismic anchor 70 or seismic plate 76 being adhered to the bottom surface of the solar panel mounting strap 18 by welding or adhesive bonding.

This alternative to embodiment 500 may further comprise:

a. a first hole through the solar panel mounting strap 18;

b. a second hole through the first strip 510;

c. a stud inserted pointing upwards through the holes so that its threaded portion thereof protrudes above the solar panel mounting strap 18; and d. a nut 42 on the protruding portion, fastening the solar panel mounting strap 18 and first strip 510 together. See FIG. 8B.

Figure 7C:
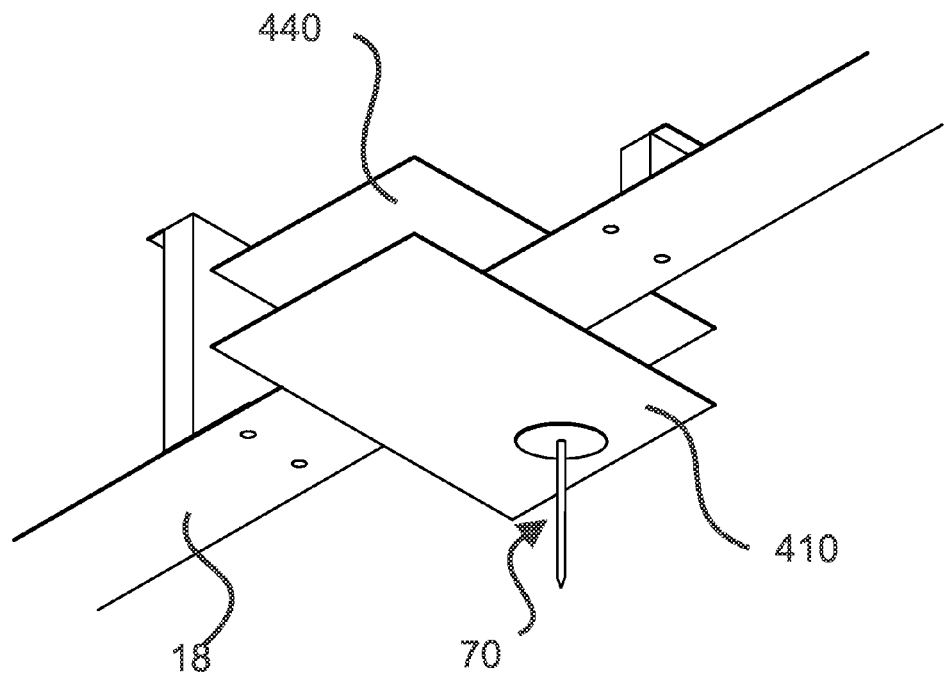
FIG. 7C is an isometric view of a fourth embodiment of this invention as used to fasten a mounting strap with brackets attached to angled solar panels in which an earthquake anchor is used to fasten the bottom strip to the roof.
Figure 8C:
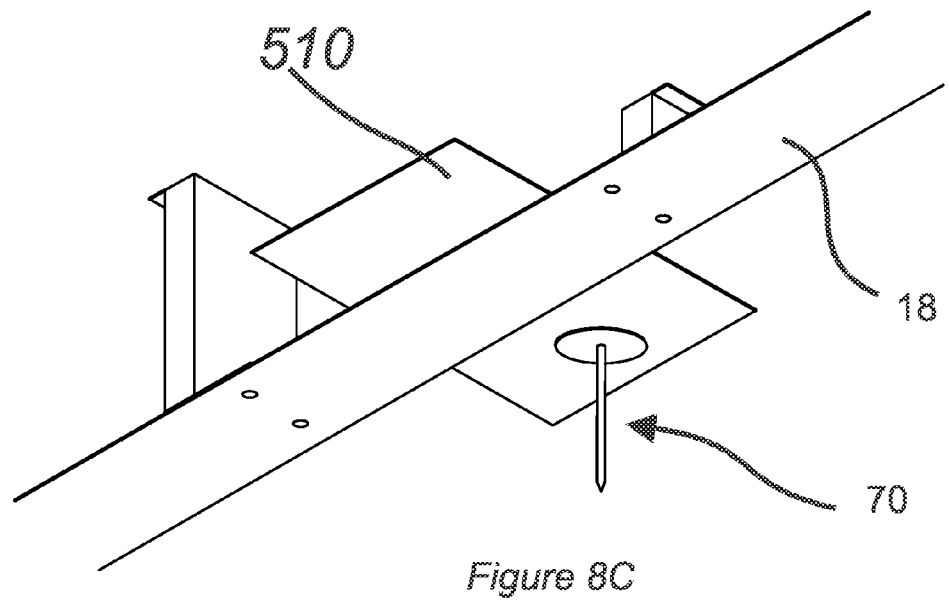
FIG. 8C is an isometric view of a fifth embodiment of this invention as used to fasten a mounting strap with brackets attached to angled solar panels in which an earthquake anchor is used to fasten the strip to the roof.

A second alternative to embodiment 400 comprises:

a. a first strip 440 of roof material longer than the solar panel mounting strap 18 is wide placed perpendicularly across the solar panel mounting strap 18; the first strip 440 having a first bottom surface;

b. a second strip 410 of roof material longer than the solar panel mounting strap 18 is wide placed perpendicularly under the solar panel mounting strap 18; and c. a seismic anchor 70 or seismic plate 76 screwed by a screw 78 into the roof substrate or a roof joist;

d. the top surface of the seismic anchor 70 or seismic plate 76 adhered to the bottom surface of the solar panel mounting strap 18 by welding or adhesive bonding;

e. the bottom surface of the first strip 440 adhered to the top surface of the second strip 410 by welding or adhesive bonding. See FIG. 7C.

This second alternative to embodiment 400 may further comprise:

a. a first hole through the solar panel mounting strap 18;

b. a second hole through the first strip 440;

c. a stud 40 inserted pointing upwards through the holes so that its threaded portion protrudes above the solar panel mounting strap 18; and d. a nut 42 on the protruding portion, fastening the solar panel mounting strap 18 and first strip 410 together. See FIG. 7B

The method of fabricating the first alternative to embodiment 400 comprises the steps of:

a. providing a first strip 440 of roof material longer than the solar panel mounting strap 18 is wide;

b. placing the first strip 440 perpendicularly across the solar panel mounting strap 18;

c. providing a second strip 410 of roof material longer than the solar panel mounting strap 18 is wide;

d. placing the second strip 410 perpendicularly under the solar panel mounting strap 18;

e. adhering the second strip 410 to the roof 22 and the first strip 440 by adhesive bonding or welding.

The method of fabricating this first alternative to embodiment 400 may further comprise the steps of:

a. drilling a first hole through the solar panel mounting strap 18;

b. drilling a second hole through the first strip 440;

c. providing a threaded stud 40;

d. inserting the threaded stud 40 pointing upwards through the holes so that the threaded portion thereof protrudes above the solar panel mounting strap 18;

e. screwing a nut 42 on the protruding portion, thereby fastening the solar panel mounting strap 18 and first strip 440 together.

The method of fabricating the alternative to embodiment 500 comprises the steps of:

a. providing a strip 510 of roof material longer than the solar panel mounting strap 18 is wide;

b. placing the strip 510 perpendicularly across the solar panel mounting strap 18;

c. providing a seismic anchor 70 or seismic plate 76; each of the seismic anchor 70 and the seismic plate 76 having a top metal plate;

d. screwing the seismic anchor 70 or seismic plate 76 into the roof substrate or a roof joist; and 3. adhering the top surface of the seismic anchor 70 or seismic plate 76 to the bottom surface of the strip 510 by welding or adhesive bonding.

The method of fabricating this alternative embodiment to embodiment 500 may further comprise the steps of:

a. drilling a first hole through the solar panel mounting strap 18;

b. drilling a second hole through the first strip 510;

c. inserting a threaded stud 40 pointing upwards through the holes so that its threaded portion protrudes above the solar panel mounting strap 18;

d. providing a nut 42;

e. screwing the nut on the protruding portion, thereby fastening the solar panel mounting strap 18 and first strip 510 together.

The method of fabricating the second alternative to embodiment 400 comprises the steps of:

a. providing a first strip 440 of roof material longer than the solar panel mounting strap 18 is wide;

b. placing the first strip 440 perpendicularly across the solar panel mounting strap 18;

c. providing a second strip 410 of roof material longer than the solar panel mounting strap 18 is wide;

d. placing the second strip 410 perpendicularly under the solar panel mounting strap 18;

e. providing a seismic anchor 70 or a seismic plate 76;

f. providing a screw 78;

g. screwing the seismic anchor 70 or seismic plate with the screw 78 into the roof substrate or a roof joist;

h. adhering the top surface of the seismic anchor 70 or seismic plate 76 to the bottom surface of the second strip 410 by welding or adhesive bonding; and i. adhering the bottom surface of the first strip to the top surface of the first strip by welding or adhesive bonding.

The method of fabricating this second alternative embodiment to embodiment 400 may further comprise the steps of:

a. drilling a first hole through the solar panel mounting strap 18;

b. drilling a second hole through the first strip 440;

c. providing a threaded stud;

d. inserting the stud pointing upwards through the holes so that its threaded portion protrudes above the solar panel mounting strap 18;

e. providing a nut 42;

f. screwing the nut 42 onto the protruding portion, thereby fastening the solar panel mounting strap 18 and first strip 440 together.

Figure 16:
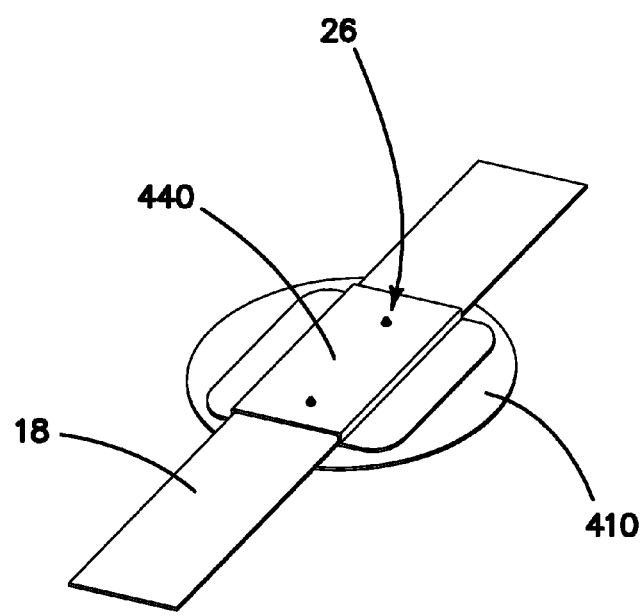
FIG. 16 illustrates that the strips in this invention may be circular instead of rectangular.

Preferably the strips and plates of this invention are rectangular. Most of the drawings show square and rectangular strips and plates. However, they can be any convenient shape such as rectangular, square, circular, hexagonal, octagonal, oval, etc. FIG. 16 shows a circular shape for the strip 410 of the fourth embodiment 400 of this invention. This is applicable to all embodiments of this invention.

Roofing is sometimes referred to as a membrane. Weldable roofing material is thermoplastic polyolefin (TPO), available from a number of companies including: Firestone Building Products of Indianapolis, Ind.; Carlisle Syntec Systems of Carlisle, Pa.; and Johns Manville of Denver, Colo. TPO can be made of polyvinyl chloride (PVC) or ethylene-propylene-diene-monomer (EPDM).

The structural adhesive 82 used in this invention to bond strips to roofs, strips to strips etc. is preferably two-component polyurethane or silicone. Such adhesives are manufactured by a number of companies. Suitable adhesives are Dash DC polyurethane, available from Versico Roofing Systems of Carlisle, Pa. and SCM3505 series high solids silicone available from Everest Systems of Houston, Tex.

For further information about installing solar panels using this invention see attached Permacity/Orion Solar Strap installation manual, which is incorporated into this application by reference.

Several embodiments 100, 200, 300, 400, 500, 600, 700 and 800 have been described. However, it should be obvious to those skilled in the art to which this invention pertains that other modifications and enhancements can be made without departing from the spirit and scope of this invention.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. A system fastening a solar panel mounting strap to a roof comprising: a strip of roof material longer than said solar panel mounting strap is wide placed perpendicularly across said solar panel mounting strap; said strip having a bottom surface; one of a seismic anchor and seismic plate screwed by a screw into the roof substrate or a roof joist; each of said seismic anchor and said seismic plate having a top metal plate having a top surface; said top surface adhered to said bottom surface by welding or adhesive bonding.

2. The fastening system as claimed in claim 1 further comprising: a. first hole through said solar panel mounting strap; a second hole through said first strip; a stud inserted pointing upwards through said holes so that a threaded portion thereof protrudes above said solar panel mounting strap; and a nut 42 on said protruding portion, fastening said solar panel mounting strap and first strip together.

3. A system fastening a solar panel mounting solar panel mounting strap to a roof comprising: a first strip of roof material longer than said solar panel mounting strap is wide placed perpendicularly across said solar panel mounting strap; said first strip having a first bottom surface; a second strip of roof material longer than said solar panel mounting strap is wide placed perpendicularly under said solar panel mounting strap; said second strip having a second bottom surface a second top surface; and one of a seismic anchor and seismic plate screwed by a screw into the roof substrate or a roof joist; each of said seismic anchor and said seismic plate having a top metal plate having a top surface; said top surface adhered to said second bottom surface by welding or adhesive bonding; said first bottom surface adhered to said second top surface by welding or adhesive bonding.

4. The fastening system as claimed in claim 3 further comprising: first hole through said solar panel mounting strap; a second hole through said first strip; a stud inserted pointing upwards through said holes so that a threaded portion thereof protrudes above said solar panel mounting strap; and a nut on said protruding portion, fastening said solar panel mounting strap and first strip together.

* * * * *